US 9,508,176 B2

United States Patent
Lucas et al.

(10) Patent No.: US 9,508,176 B2
(45) Date of Patent: Nov. 29, 2016

(54) PATH AND SPEED BASED CHARACTER CONTROL

(71) Applicant: LUCASFILM ENTERTAINMENT COMPANY LTD., San Francisco, CA (US)

(72) Inventors: George Lucas, San Francisco, CA (US); Domenico Porcino, Novato, CA (US); Adam Schnitzer, Petaluma, CA (US); Louise Rasmussen, Fairfax, CA (US); Kent Oberheu, Berkeley, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 191 days.

(21) Appl. No.: 13/679,046

(22) Filed: Nov. 16, 2012

(65) Prior Publication Data

US 2013/0141427 A1 Jun. 6, 2013

Related U.S. Application Data

(60) Provisional application No. 61/561,654, filed on Nov. 18, 2011.

(51) Int. Cl.
*G06T 13/00* (2011.01)
*G06T 13/20* (2011.01)
*G06T 13/80* (2011.01)

(52) U.S. Cl.
CPC ............... *G06T 13/20* (2013.01); *G06T 13/80* (2013.01); *A63F 2300/646* (2013.01); *A63F 2300/6607* (2013.01)

(58) Field of Classification Search
CPC ..... G06T 15/005; G06T 13/40; G06T 13/80; G06T 13/00; G06T 2200/24; G06F 3/011; A63F 13/10; A63F 2300/66
See application file for complete search history.

(56) References Cited

U.S. PATENT DOCUMENTS 5,790,124 A 8/1998 Fischer
5,831,260 A 11/1998 Hansen
(Continued)

FOREIGN PATENT DOCUMENTS

EP 1918880 A2 7/2008
EP 1946243 A2 7/2008
(Continued)

OTHER PUBLICATIONS

Julian MacDonald, "Animating Vehicles", posted Sep. 2002, http://aoi.sourceforge.net/docs/cartut/vehicle_tut.*
(Continued)

*Primary Examiner* — Said Broome
*Assistant Examiner* — Sarah Le
(74) *Attorney, Agent, or Firm* — Kilpatrick Townsend & Stockton LLP

(57) ABSTRACT

A 3D animation environment that includes an animation object is generated. A movement speed is assigned to object the 3D animation environment. An animation path containing at least first and second waypoints is generated. An animation sequence is generated by identifying a first section of the animation path connected to the first waypoint. A first animation of the animation object is generated in which the animation object moves along the first section of the path at the movement speed. A spatial gap in the animation path is identified between the first and second waypoints. A second animation of the animation object is generated in which the animation object moves, by keyframe animation, from the first waypoint to the second waypoint. A third animation of the animation object is generated in which the animation object moves along at least a second portion of the path at the movement speed.

15 Claims, 26 Drawing Sheets

(56) References Cited

U.S. PATENT DOCUMENTS

| | | |
|---|---|---|
| 5,932,417 A | 8/1999 | Birnbaumer et al. |
| 6,072,496 A | 6/2000 | Guenter et al. |
| 6,091,427 A | 7/2000 | Boezeman et al. |
| 6,115,052 A | 9/2000 | Freeman et al. |
| 6,144,385 A | 11/2000 | Girard |
| 6,166,811 A | 12/2000 | Long et al. |
| 6,208,348 B1 | 3/2001 | Kaye |
| 6,324,296 B1 | 11/2001 | McSherry et al. |
| 6,353,422 B1 | 3/2002 | Perlman |
| 6,353,437 B1 | 3/2002 | Gagne |
| 6,438,255 B1 | 8/2002 | Lesniak |
| 6,515,659 B1 | 2/2003 | Kaye et al. |
| 6,522,332 B1 | 2/2003 | Laneiault et al. |
| 6,606,095 B1 | 8/2003 | Lengyel et al. |
| 6,614,407 B2 | 9/2003 | Perlman |
| 6,614,428 B1 | 9/2003 | Lengyel |
| 6,629,065 B1 | 9/2003 | Gadh et al. |
| 6,633,294 B1 | 10/2003 | Rosenthal et al. |
| 6,686,926 B1 | 2/2004 | Kaye |
| 6,714,201 B1 | 3/2004 | Grinstein et al. |
| 6,919,892 B1 | 7/2005 | Cheiky et al. |
| 6,972,765 B1 | 12/2005 | Duplat |
| 6,977,630 B1 | 12/2005 | Donath et al. |
| 7,027,054 B1 | 4/2006 | Cheiky et al. |
| 7,035,436 B2 | 4/2006 | Nakamura et al. |
| 7,098,920 B2 | 8/2006 | Marschner et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,129,949 B2 | 10/2006 | Marschner et al. |
| 7,164,718 B2 | 1/2007 | Maziere et al. |
| 7,184,047 B1 | 2/2007 | Crampton |
| 7,212,656 B2 | 5/2007 | Liu et al. |
| 7,292,261 B1 | 11/2007 | Teo |
| 7,324,121 B2 | 1/2008 | Young |
| 7,433,807 B2 | 10/2008 | Marschner et al. |
| 7,450,126 B2 | 11/2008 | Marschner et al. |
| 7,535,472 B2 | 5/2009 | Kim et al. |
| 7,554,549 B2 | 6/2009 | Sagar et al. |
| 7,605,861 B2 | 10/2009 | LaSalle et al. |
| 7,848,564 B2 | 12/2010 | Sullivan et al. |
| 7,965,294 B1 | 6/2011 | Milliron |
| 8,019,137 B2 | 9/2011 | Sullivan et al. |
| 8,130,225 B2 | 3/2012 | Sullivan et al. |
| 8,144,153 B1 | 3/2012 | Sullivan et al. |
| 8,606,678 B2 | 12/2013 | Jackowitz et al. |
| 8,701,008 B2 | 4/2014 | Keng et al. |
| 9,030,477 B2 | 5/2015 | Schnitzer et al. |
| 2001/0024512 A1 | 9/2001 | Yoronka et al. |
| 2001/0033675 A1 | 10/2001 | Maurer et al. |
| 2002/0041285 A1 | 4/2002 | Hunter et al. |
| 2002/0060649 A1 | 5/2002 | Perlman |
| 2004/0012593 A1 | 1/2004 | Lanciault |
| 2004/0027352 A1 | 2/2004 | Minakuchi |
| 2004/0063481 A1 | 4/2004 | Wang |
| 2004/0100482 A1 | 5/2004 | Cajolet et al. |
| 2004/0119716 A1 | 6/2004 | Park et al. |
| 2004/0119717 A1 | 6/2004 | Furumoto et al. |
| 2004/0155962 A1 | 8/2004 | Marks |
| 2004/0161132 A1 | 8/2004 | Cohen et al. |
| 2004/0179008 A1 | 9/2004 | Gordon et al. |
| 2005/0071306 A1* | 3/2005 | Kruszewski ............ A63F 13/10 706/47 |
| 2005/0078124 A1 | 4/2005 | Liu et al. |
| 2005/0099414 A1 | 5/2005 | Kaye et al. |
| 2005/0104878 A1 | 5/2005 | Kaye et al. |
| 2005/0146521 A1 | 7/2005 | Kaye et al. |
| 2005/0156932 A1 | 7/2005 | Vienneau et al. |
| 2005/0231505 A1 | 10/2005 | Kaye et al. |
| 2006/0055699 A1 | 3/2006 | Perlman et al. |
| 2006/0055706 A1 | 3/2006 | Perlman et al. |
| 2006/0067573 A1 | 3/2006 | Parr et al. |
| 2006/0126928 A1 | 6/2006 | Edwards et al. |
| 2006/0157640 A1 | 7/2006 | Perlman et al. |
| 2006/0192785 A1 | 8/2006 | Marschner et al. |
| 2006/0192854 A1 | 8/2006 | Perlman et al. |
| 2006/0228101 A1 | 10/2006 | Sullivan et al. |
| 2007/0052711 A1 | 3/2007 | Gordon et al. |
| 2007/0081695 A1 | 4/2007 | Foxlin et al. |
| 2007/0091178 A1 | 4/2007 | Cotter et al. |
| 2007/0126743 A1 | 6/2007 | Park et al. |
| 2007/0133841 A1 | 6/2007 | Zhang et al. |
| 2007/0262996 A1 | 11/2007 | Fernandez et al. |
| 2008/0100622 A1 | 5/2008 | Gordon |
| 2008/0170077 A1 | 7/2008 | Sullivan et al. |
| 2008/0170078 A1 | 7/2008 | Sullivan et al. |
| 2008/0170777 A1 | 7/2008 | Sullivan et al. |
| 2008/0180448 A1 | 7/2008 | Anguelov et al. |
| 2009/0046097 A1 | 2/2009 | Franklin |
| 2009/0209343 A1 | 8/2009 | Foxlin et al. |
| 2010/0002934 A1 | 1/2010 | Sullivan et al. |
| 2010/0085351 A1 | 4/2010 | Deb et al. |
| 2010/0156911 A1 | 6/2010 | Zhao et al. |
| 2010/0164862 A1 | 7/2010 | Sullivan et al. |
| 2010/0207949 A1 | 8/2010 | Spencer |
| 2010/0207950 A1 | 8/2010 | Zhao et al. |
| 2010/0214313 A1* | 8/2010 | Herman et al. ............... 345/593 |
| 2012/0021828 A1 | 1/2012 | Raitt et al. |
| 2012/0327088 A1 | 12/2012 | Schnitzer et al. |
| 2014/0250392 A1 | 9/2014 | Riggins et al. |

FOREIGN PATENT DOCUMENTS

| | | |
|---|---|---|
| JP | 10-261090 | 9/1998 |
| WO | 2004/041379 | 5/2004 |
| WO | 2007/044301 A2 | 4/2007 |
| WO | 2009/007917 A2 | 1/2009 |
| WO | 2010/051493 A2 | 5/2010 |
| WO | 2012/177991 A1 | 12/2012 |

OTHER PUBLICATIONS

Autodesk, Inc. "Autodesk Maya 2010: Getting Started with Maya", 2009, downloaded from the internet at: http://images.autodesk.com/adsk/files/gettingstartedmaya2010.pdf on Jun. 29, 2011, Cover page, Table of Contents, Chapter 6, 135 pages.

Microsoft, "APP HUB Community Forums: Exporting Animation Step Keys", Oct. 21, 2008, downloaded from the internet at: http://forums.create.msdn.com/forums/t/18976.aspx Jun. 28, 2011, 1 page.

PL Studios, Inc. "Digital Tutors: Community Forums: Thread: Character Animation Problem: Phantom Step Key Pops Leg Up??" Jun. 17, 2009, downloaded from the internet at: http://www.digitaltutors.com/forum/showthread.php?18630-Character-Animation-problem-Phantom-step-key-pops-leg-up on Jun. 28, 2011, 2 pages.

Silicon Graphics, Inc. "IRIX 6.5 Product Release Notes/Information", downloaded from the internet at http://techpubs.sgi.com/library/tpl/cgi-bin/getdoc.cgi?coll=0650&db=relnotes&fname=/usr/relnotes/cosmoworlds on Apr. 2, 2012, 33 pages.

The University of Queensland, "VisLab: Creating and Animating a Rocket", Jan. 18, 2001, downloaded from the internet at: http://www.vislab.uq.edu.au/users/manuals/cosmoworlds/Tutorial/rocket_intro.html on Apr. 2, 2012, 18 pages.

Wikipedia, "Animation" May 28, 2010, downloaded from the internet at: http://web.archive.org/web/20100528081917/http:/en.wikipedia.org/wiki/Animation on Jun. 28, 2011, 10 pages.

Wikipedia, "Bezier Curve", May 30, 2010, downloaded from the internet at: http://web.archive.org/web/20100530233921/http:/en.wikipedia.org/wiki/B%C3%A9zier_curve on Jun. 28, 2011, 10 pages.

Wikipedia, "Computer Animation", Apr. 30, 2010, downloaded from the internet at: http://web.archive.org/web/20100430162149/http:/en.wikipedia.org/wiki/Computer_animation on Jun. 28, 2011, 7 pages.

Wikipedia, "Spline (mathematics)", Oct. 14, 2009, downloaded from the internet at: http://web.archive.org/web/20091014015215/http:/en.wikipedia.org/wiki/Spline_(mathematics) on Jun. 28, 2011, 8 pages.

(56) References Cited

OTHER PUBLICATIONS

Giambrune, Mark: "*3D Graphics & Animation, 2nd Edition*", 2002, New Riders Publishing, USA, XP002695294, pp. 368-380, pp. 372, 373, 376.

Notification of Transmittal of the International Search Report and the Written Opinion of the International Searching Authority, or the Declaration; International Search Report and Written Opinion of the International Searching Authority for corresponding International Application No. PCT/US2012/065518 mailed on Apr. 26, 2013, 18 pages.

International Preliminary Report on Patentability and Written Opinion dated May 20, 2014 for International Application No. PCT/US2012/065518, 12 pages.

U.S. Appl. No. 13/168,189, filed Jun. 24, 2011, first named inventor: Adam Schnitzer.

International Preliminary Report on Patentability and Written Opinion of the International Searching Authority for corresponding International Application No. PCT/US2012/043722 mailed on Dec. 24, 2013, 5 pages.

International Search Report and Written Opinion for PCT/US2012/043722, mailed on Oct. 23, 2012, 8 pages.

Anguelov et al., "SCAPE: Shape Completion and Animation of People," 2005, ACM Inc., pp. 408-416.

Agarwala, A., "Keyframe-Based Tracking for Rotoscoping and Animation," ACM SIGGRAPH '04 conference proceedings, 2004, pp. 1-8.

Bascle, Blake, "Separability of pose and expression in facial tracking and animation," Jan. 1998, IEEE Computer Society, Proceedings of the Sixth International Conference on Computer Vision, pp. 323-328.

Bespalov et al., "Local Feature Extraction and Matching Partial Objects," Drexel University, Aug. 6, 2006, pp. 1-30.

Buenaposada, Jose M., "Performance driven facial animation using illumination independent appearance-based tracking," in Proceedings of ICPR, Hong Kong, Aug. 2006, 4 pages.

Chang et al., "Automatic 3D Facial Expression Analysis in Videos," Proc. IEEE Int'l Workshop Analysis and Modeling of Faces and Gestures (AMFG '05), vol. 3723, pp. 293-307, 2005.

Curio et al., "Semantic 3D Motion Retargeting for Facial Animation," ACM Jul. 28-29, 2006, pp. 77-84, 176.

Debevec et al., "Acquiring the Reflectance Field of a Human Face," SIGGRAPH 2000 Conference Proceedings, pp. 1-12, 2000.

Deng et al., "Animating blendshape faces by cross-mapping motion capture data," In Proceedings of the 2006 Symposium on Interactive 3D Graphics and Games (Redwood City, California, Mar. 14-17, 2006). I3D '06. ACM, New York, NY, 43-48.

Dominici, Paolo, "ZV Parent Master 1.2—New features video", Nov. 14, 2008, XP002709924, Retreived from the Internet: URL:http://www.youtube.com/watch?v=vHNMwWj2Cyw [retrieved on Jul. 23, 2013].

Furukawa et al., "Dense 3D Motion Capture from Synchronized Video Streams," [online], [retrieved on Aug. 26, 2009]. Retrieved from the Internet <URL: http://www.cs.washington.edu/homes/furukawa/papers/cvpr08b.pdf>, 8 pages.

Gleicher, Michael, "Animation From Observation: Motion Capture and Motion Editing," Computer Graphics 33(4), 1999, pp. 1-5.

Grung et al., "Missing values in principal component analysis," Chimometrics and Intelligent Laboratory Systems, 1998, 42:125-139.

Heap et al., "Towards 3D Hand Tracking using a Deformable Model," Proceedings of the Second International Conference on Automatic Face and Gesture Recognition, 1996, pp. 140-145.

Heck et al., "Splicing Upper-Body Actions with Locomotion," Eurographics 2006, vol. 25 (2006), No. 3, pp. 459-466.

Herda et al., "Skeleton-Based Motion Capture for Robust Reconstruction of Human Motion," Computer Animation 2000 Proceedings, 2000, pp. 77-83.

Heseltine et al., "Three-Dimensional Face Recognition: An Eigensurface Approach," 2004 International Conference on Image Processing (ICIP), pp. 1421-1424.

Horprasert et al., "Real-time 3D Motion Capture," Second workshop on Perceptual Interfaces, San Francisco, Nov. 1998, 4 pages.

Lin et al., "Extracting 3D Facial Animation Parameters from Multiview Video Clips," IEEE Computer Graphics and Applications, 2002, 22(6):72-80.

Majkowska et al., "Automatic splicing for hand and body animations," 2006. In Proceedings of the 2006 ACM SIGGRAPH/Eurographics symposium on Computer animation (SCA '06). Eurographics Associate, Aire-la-Ville, Switzerland, Switzerland, pp. 309-316 and 369.

Markoff, J., "Camera System Creates Sophisticated 3-D Effects," [online], New York Times, Jul. 31, 2006, [retrieved on Jul. 31, 2006]. Retrieved from the Internet: <URL: www.nytimes.com/2006/0731/technology/31motion.html>, 4 pages.

Park et al., "Capturing and Animating Skin Deformation in Human Motion," ACM 2006, pp. 881-889.

Parke, F., "Computer Generated Animation of Faces," Aug. 1972, SIGGRAPH 1972, pp. 451-457.

Preteux et al., "Model-Based Head Tracking and 3D Pose Estimation," Sep. 24, 1998, Institut National des Telecommunications, 15 pages.

Wren et al., "Dynamic Models of Human Motion," [online], 1998, [retrieved on Aug. 26, 2009]. Retrieved from the Internet <URL: http://www.drwren.com/chris/dyna/TR-415.pdf>, 6 pages.

Zhang et al., "Geometry-Driven Photorealistic Facial Expression Synthesis," IEEE Transactions on Visualization and Computer Graphics, vol. 12, No. 1, Jan./Feb. 2006, pp. 48-60.

U.S. Appl. No. 13/168,189, filed Jun. 24, 2011, Non Final Rejection mailed Oct. 7, 2013, all pages.

U.S. Appl. No. 13/168,189, filed Jun. 24, 2011, Final Rejection mailed Mar. 24, 2014, all pages.

U.S. Appl. No. 13/168,189, filed Jun. 24, 2011, Non Final Rejection mailed Jul. 2, 2014, all pages.

U.S. Appl. No. 13/168,189, filed Jun. 24, 2011, Notice of Allowance mailed Jan. 15, 2015, all pages.

Examination report from the United Kingdom Intellectual Property Office for application No. GB0922650.7 dated Apr. 9, 2014, 5 pages.

Search Report from United Kingdom Intellectual Property Office for application No. GB0922650.7, dated Apr. 20, 2010, 2 pages.

Examination report from the United Kingdom Office for Application No. PCT/US2006/009787, dated Aug. 3, 2009, 2 pages.

Examination report from Australian Patent Office for Application No. 2009251176, dated Jan. 20, 2014, 5 pages.

Examination report from European Patent Office for Application No. GB0718003.7, dated Aug. 3, 2009, 2 pages.

Examination Report from New Zealand Patent Office for Application No. 561570, dated Jul. 7, 2009, 2 pages.

Examination Report from New Zealand Patent Office for Application No. 561570, dated Dec. 18, 2009, 1 page.

Examination Report from New Zealand Patent Office for Application No. 581496, dated Dec. 2, 2009, 2 pages.

Examination Report from New Zealand Patent Office for Application No. 582356, dated Jan. 7, 2010, 2 pages.

International Search Report and Written Opinion for PCT/US2006/009787 dated Oct. 29, 2007, 8 pages.

International Preliminary Report on Patentability for PCT/US2006/009787 issued Nov. 13, 2007, 8 pages.

Office Action issued in AU application No. 2009240847 mailed Nov. 23, 2011, 4 pages.

International Search Report and Written Opinion for PCT/US2012/042508 mailed Sep. 6, 2013, 7 pages.

International Preliminary Report on Patentability for PCT/US2012/042508 issued Dec. 17, 2013, 5 pages.

\* cited by examiner

PATH AND SPEED BASED CHARACTER CONTROL

This application claims priority to U.S. Provisional Application No. 61/561,654, filed Nov. 18, 2011, entitled "Path and Speed Based Character Control", the entire contents of which are hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In the physical world, persons, animals and vehicles have ranges of natural speeds at which they move; for example, people typically walk and run. When a director is coordinating the movements and placements of actors and stage items (i.e., "stage blocking"), the actual physical limitations of actors place constraints on what actions can occur within a certain amount of time or space.

In contrast, a keyframe animation system has no intrinsic notion of speed, and it is up to the animator to figure out the reasonable keyframes that will make the character move at a particular speed. In other words, because there is no indication of speed, the animator will have to make an educated guess, or use a calculator.

SUMMARY

This specification describes technologies relating to character animation. For example, a user can specify that a character is moving by walking, as opposed to, say, by flying, running or crawling. Way points can be placed on the ground in a virtual environment and the system can determine, based on the walking specification, when the character plausibly gets to the respective way points. The system can perform animation based on this information. For example, this can provide a hybrid of keyframed and speed based animation in which a scene is animated first by keyframe animation, then speed-based animation, then by keyframe animation again. If the path is later modified the speed will be maintained, or the user can specify constraints, for example when a character should arrive at a particular point.

In one aspect, a computer program product is embodied in a non-transitory computer-readable storage medium and includes instructions that when executed by a processor perform a method for animating assets. The method includes generating a 3D animation environment that includes at least one animation object. The method further includes assigning, to the animation object, a movement speed for moving the animation object in the 3D animation environment. The method further includes generating an animation path in the 3D animation environment, the animation path containing at least first and second waypoints. The method further includes generating, after generating the animation path, an animation sequence by identifying a first section of the animation path connected to the first waypoint. Generating the animation sequence further includes, responsive to identifying the first section, generating a first animation of the animation object in which the animation object moves along the first section of the path at the movement speed. Generating the animation sequence further includes identifying a spatial gap in the animation path between the first and second waypoints. Generating the animation sequence further includes, responsive to identifying the spatial gap, generating a second animation of the animation object in which the animation object moves, by keyframe animation, from the first waypoint to the second waypoint. Generating the animation sequence further includes identifying a second section of the path connected to the second waypoint. Generating the animation sequence further includes, responsive to identifying the second section of the path, generating a third animation of the animation object in which the animation object moves along at least a second portion of the path that begins at the second waypoint at the movement speed.

Implementations can include any, all, or none of the following features. The method includes, after generating the first animation, the second animation, and the third animation, editing the path; and generating, based on at least the edited path, a fourth animation that includes the animation object moving along at least a portion the edited path at the movement speed. The method includes indicating the time in the animation sequence when the animation object will arrive at a point in the path. An edit to a location on the path results in i) a playhead moving to a corresponding location on an animation timeline and ii) a second object in the 3D animation environment moving to a location in the 3D animation environment that is associated with the second object at the corresponding location of the animation timeline. One portion of the path is defined in the 3D animation environment based on a first frame of reference and another portion of the path is defined in the 3D animation environment based on a second frame of reference.

In one aspect, a system includes one or more processors. The system further includes a computer-readable medium having stored therein instructions that when executed generate an animation system configured to perform operations including generating a 3D animation environment that includes at least one animation object. The instructions further include assigning, to the animation object, a movement speed for moving the animation object in the 3D animation environment. The instructions further include generating an animation path in the 3D animation environment, the animation path containing at least first and second waypoints. The instructions further include generating, after generating the animation path, an animation sequence by identifying a first section of the animation path connected to the first waypoint. Generating the animation sequence further includes, responsive to identifying the first section, generating a first animation of the animation object in which the animation object moves along the first section of the path at the movement speed. Generating the animation sequence further includes identifying a spatial gap in the animation path between the first and second waypoints. Generating the animation sequence further includes, responsive to identifying the spatial gap, generating a second animation of the animation object in which the animation object moves, by keyframe animation, from the first waypoint to the second waypoint. Generating the animation sequence further includes identifying a second section of the path connected to the second waypoint. Generating the animation sequence further includes, responsive to identifying the second section of the path, generating a third animation of the animation object in which the animation object moves along at least a second portion of the path that begins at the second waypoint at the movement speed.

Implementations can include any, all, or none of the following features. The instructions include, after generating the first animation, the second animation, and the third animation, editing the path; and generating, based on at least the edited path, a fourth animation that includes the animation object moving along at least a portion the edited path at the movement speed. The instructions include indicating the time in the animation sequence when the animation object will arrive at a point in the path. An edit to a location on the path results in i) a playhead moving to a corresponding location on an animation timeline and ii) a second object in the 3D animation environment moving to a location in the 3D animation environment that is associated with the second object at the corresponding location of the animation timeline. One portion of the path is defined in the 3D animation environment based on a first frame of reference and another portion of the path is defined in the 3D animation environment based on a second frame of reference.

In one aspect, a computer-readable medium having stored therein instructions that when executed perform a method. The method includes generating a 3D animation environment that includes at least one animation object. The method further includes assigning, to the animation object, a movement speed for moving the animation object in the 3D animation environment. The method further includes generating an animation path in the 3D animation environment, the animation path containing at least first and second waypoints. The method further includes generating, after generating the animation path, an animation sequence by identifying a first section of the animation path connected to the first waypoint. Generating the animation sequence further includes, responsive to identifying the first section, generating a first animation of the animation object in which the animation object moves along the first section of the path at the movement speed. Generating the animation sequence further includes identifying a spatial gap in the animation path between the first and second waypoints. Generating the animation sequence further includes, responsive to identifying the spatial gap, generating a second animation of the animation object in which the animation object moves, by keyframe animation, from the first waypoint to the second waypoint. Generating the animation sequence further includes identifying a second section of the path connected to the second waypoint. Generating the animation sequence further includes, responsive to identifying the second section of the path, generating a third animation of the animation object in which the animation object moves along at least a second portion of the path that begins at the second waypoint at the movement speed.

Implementations can include any, all, or none of the following features. The method includes, after generating the first animation, the second animation, and the third animation, editing the path; and generating, based on at least the edited path, a fourth animation that includes the animation object moving along at least a portion the edited path at the movement speed. The method includes indicating the time in the animation sequence when the animation object will arrive at a point in the path. An edit to a location on the path results in i) a playhead moving to a corresponding location on an animation timeline and ii) a second object in the 3D animation environment moving to a location in the 3D animation environment that is associated with the second object at the corresponding location of the animation timeline. One portion of the path is defined in the 3D animation environment based on a first frame of reference and another portion of the path is defined in the 3D animation environment based on a second frame of reference.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to animating characters or other objects or items, such as in a virtual three-dimensional (3D) environment. In the following description, examples of animated characters are discussed. However, other types of objects or items may be similarly animated. These other types of objects or items include, but are not limited to, virtual cameras, lighting sources, and 2D images (e.g. "sprites").

In some implementations, a character can be designated to walk, way points can be placed on the ground, and the system can determine when the character can plausibly get to those points. Subsequent modifications to the path can maintain the speed, or the user can specify constraints such as when a character should arrive at a particular point, and the system can allow that to be keyframed, achieving a hybrid of keyframed and speed based animation.

The system can provide trouble-shooting mechanisms to help work out details and issues in a scene, such as when a character needs to get to a particular point, but cannot plausibly run fast enough to get there. For example, if the events planned for a scene would require a character to run at twenty miles per hour, this situation can be identified as problematic and a user can be prompted to alter the scene.

A character can move along a path at a certain speed. Edits can be made to the path subject to constraints. The constraints can be, for example, that the character must complete the motion at a certain speed, or within a certain time. Portions of the path might be constrained to different speeds or arrival times than other portions. If the path is edited so that its shape or length changes, the speeds can optionally be recalculated so that speeds or arrival times at certain locations can be maintained. This can allow the user to ensure that the character will be at the right place at the right time. If the user sets up conflicting constraints, for example an arrival time that would require the character to move implausibly fast, the system can provide visual feedback to help the user resolve those problems interactively. Additionally, the character can be made to pop from place to place at particular times.

In some implementations, time-based editing of a scene can occur in a timeline. By making speed an integrated part of the workflow, the timing of the scene can be controlled in the 3d view, for example by changing the speed of the character.

Figure 1:
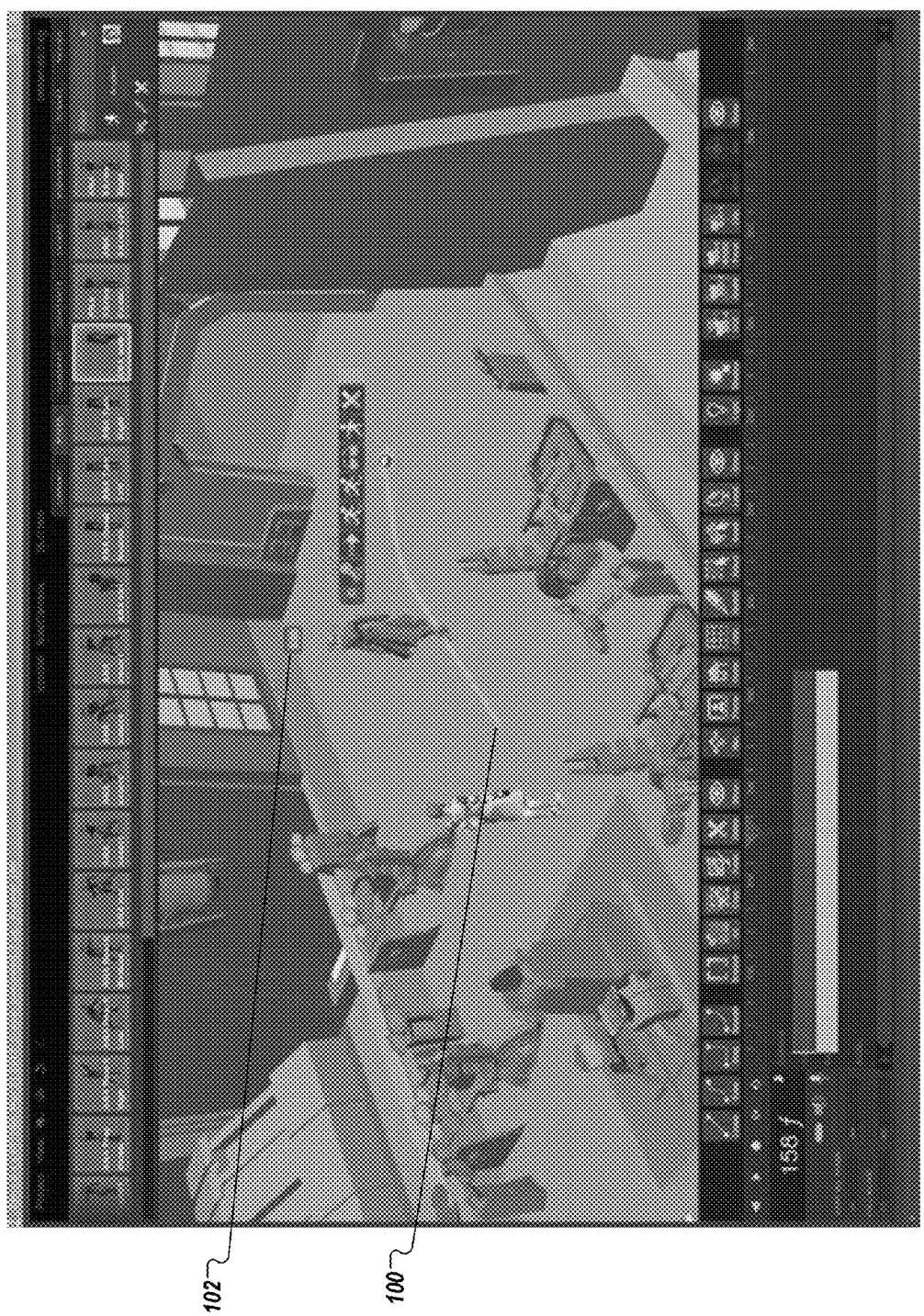
FIGS. 1-21 show examples of character control.

FIG. 1 shows a view of a virtual 3D environment that includes multiple characters. For one of the characters, a path 100 has been defined, as indicated by a solid arc. The character's speed can be set for the entire path. To create a path, a user clicks on the ground surface to set path points. Each path point sets a mark that the character will pass through along the path. With each click, the path is extended, and the temporal duration of the path is increased based on the speed at which the character should travel. A slow speed makes for a temporally longer travel; a fast speed makes for a temporally shorter travel. That is, in this example, speed determines travel duration, not the other way around.

Figure 2:
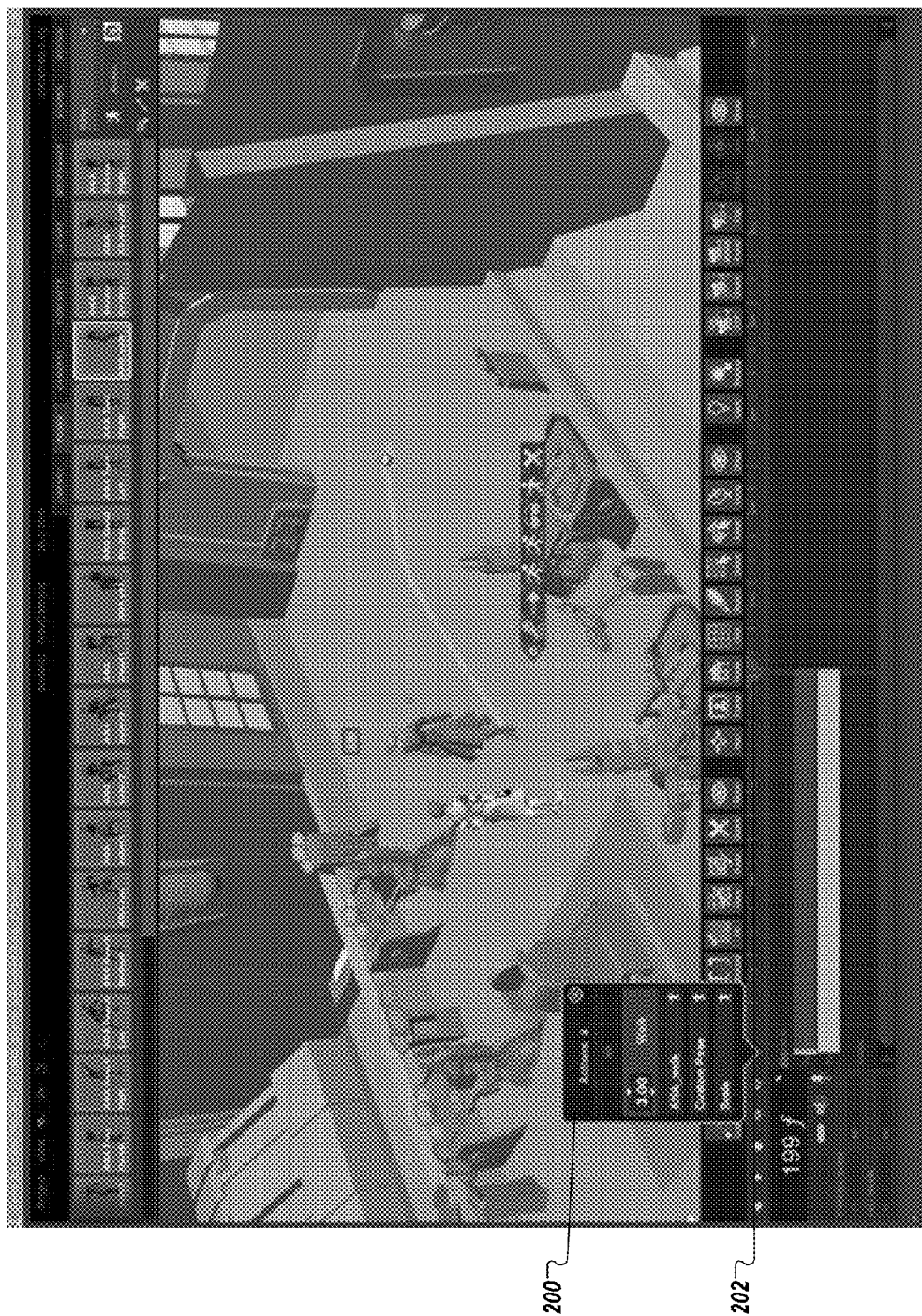

FIG. 2 shows that a speed for the entire path can be adjusted at a particular point, which can result in or be caused by a change in the length of the path in the timeline displayed toward the bottom of the view in this example. The adjustment can be initiated using one or more controls in a popup window 200, to name just one example. In one implementation, when edits to the path are made in the 3D view, or when adjustments are made to the travel duration in the timeline, the playhead 202 may remain fixed in time.

In another implementation, when edits to the path are made in the 3D view, or when adjustments are made to the travel duration in the timeline, the playhead 202 can first be adjusted to, or stay at, the end of the path, and thereafter jump forward with each new click to maintain the position at the end of the path. As such, the user can be provided with feedback of what is occurring in the scene at each time.

Figure 3:
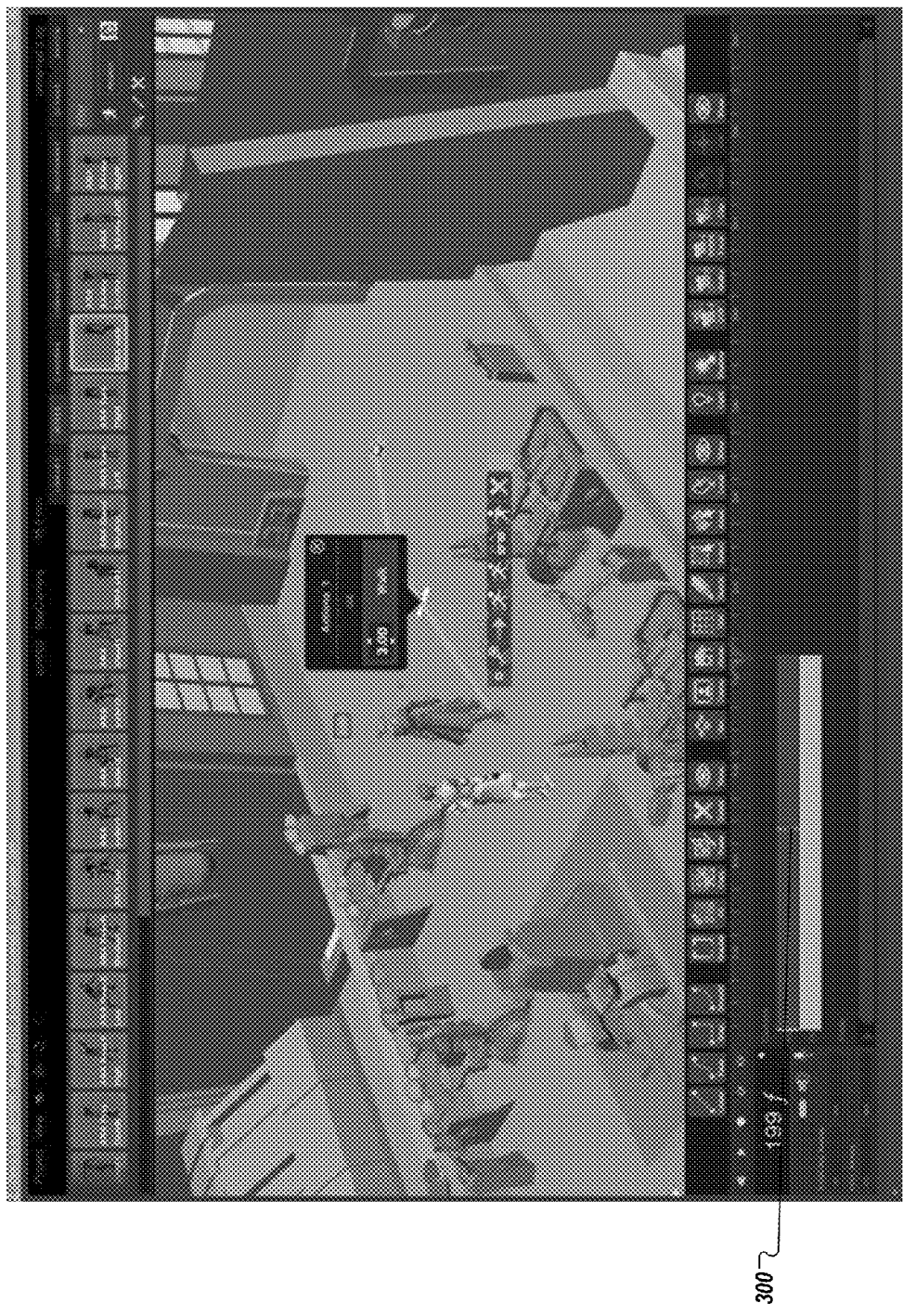

FIG. 3 shows that the change of speed can be indicated on the path by a tick mark 300. Other visual indications can be used. For example, a pop-up window showing may be placed on the path showing the speed at which a character can traverse the path.

Figure 4:

FIG. 4 shows a case in which a path contains two speeds. In some implementations, if the speed of the character is changed at a mark, only the path portion after an associated bar and speedmark is adjusted. In this implementation, the character 400 is adjusted to walk slower, and the spatial configuration of the second section 402 of path has not changed, but its corresponding timeline component 404 can be longer. In other situations, there may be multiple speed marks along the path, each one causing the character 400 to speed up or slow down. If the speed of a mark that is mid-path is adjusted, only the section of the pathbar after the mark may be affected and only until the next downstream speedmark.

Figure 5:
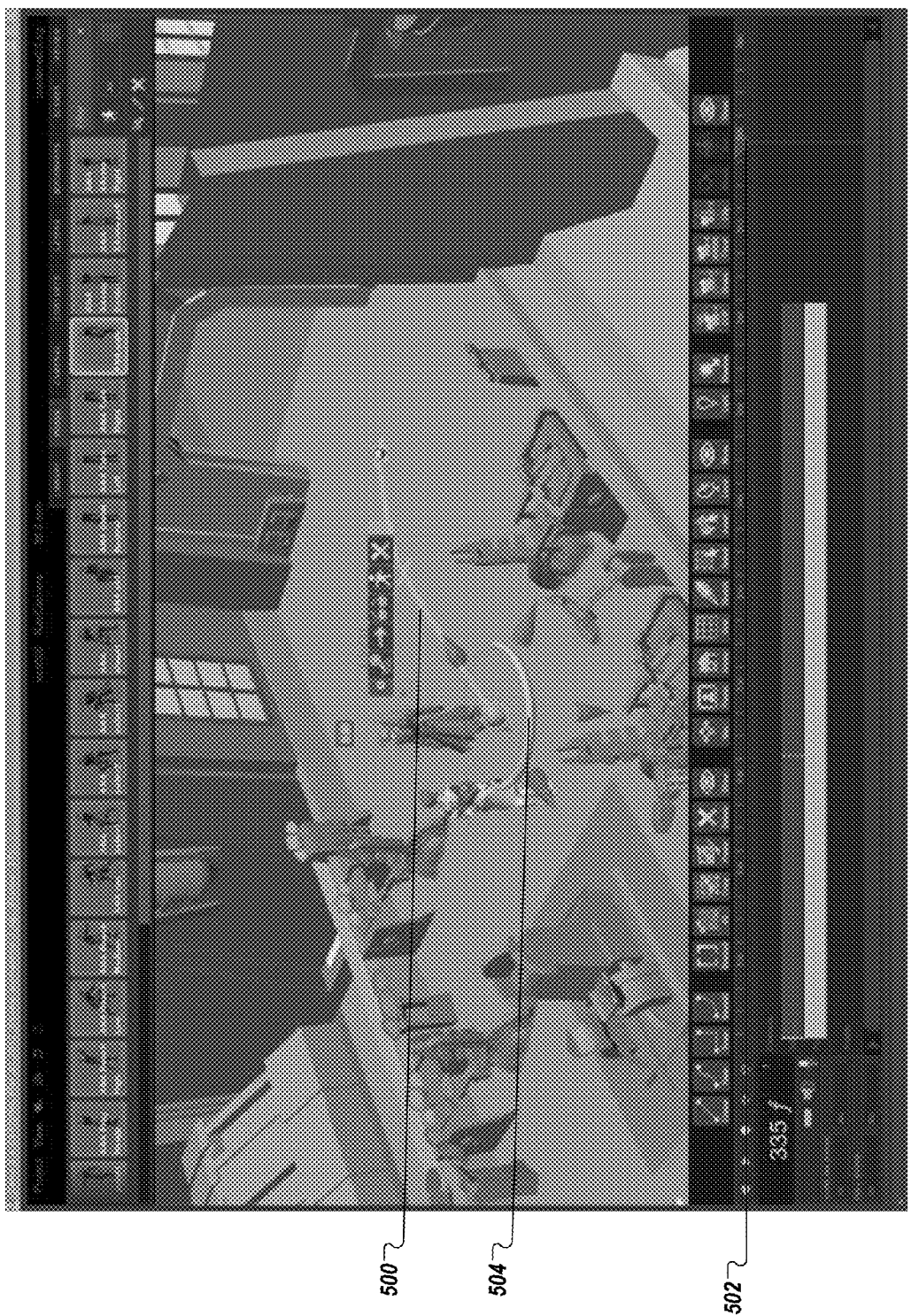

FIG. 5 shows the completed path 500 and also that the playhead 502 has been advanced by several seconds. Here, the character can remain where he ended his previous movement. A turn by the character can be created using a circle segment manipulator 504, for example as indicated.

Figure 6:
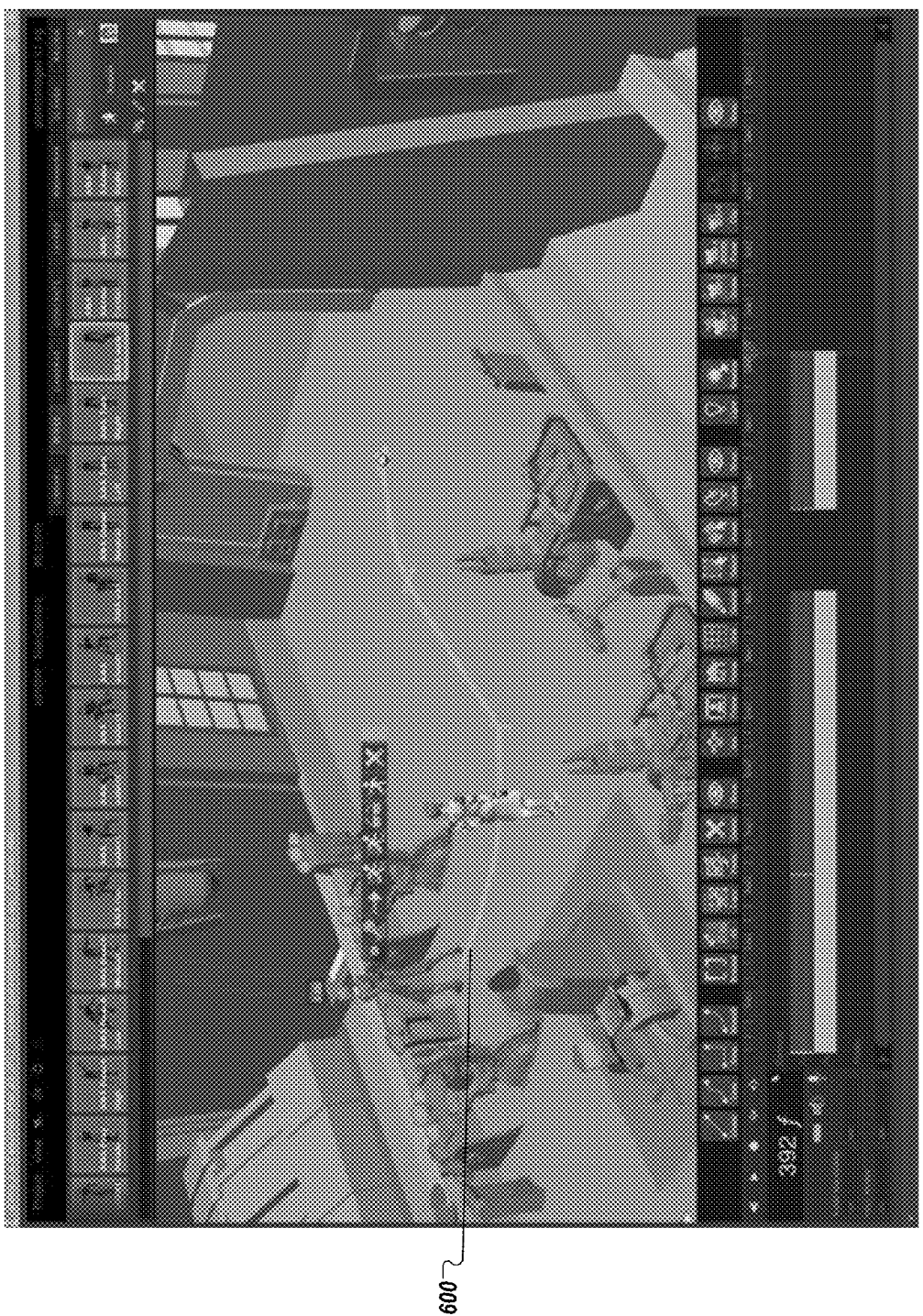

FIG. 6 shows that a second path section 600 is created for the same character. This second path section 600 may be in the same environment as previous paths, but unrelated to the previous paths.

Figure 7:
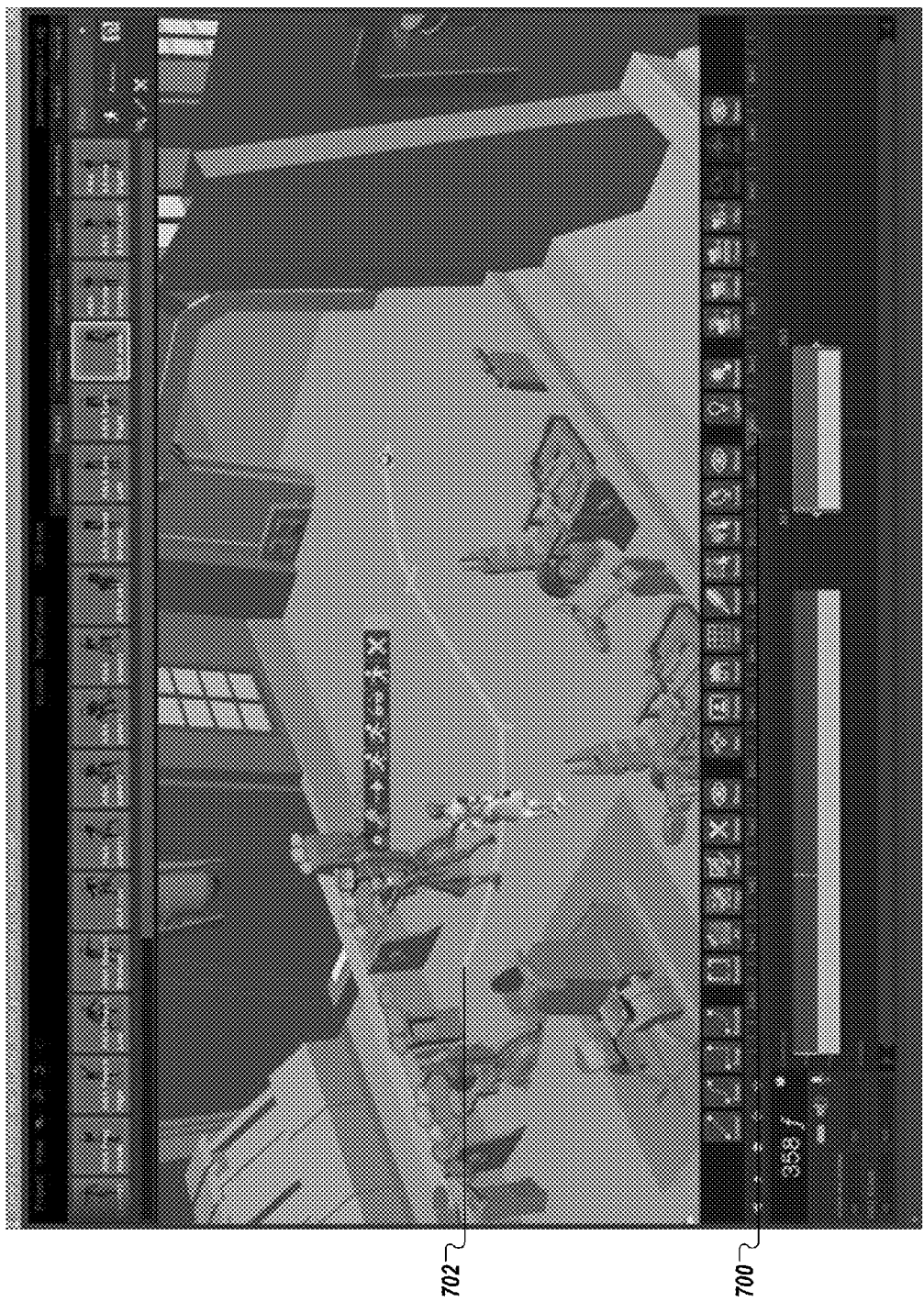

FIG. 7 shows that the timing of a character's movement can be adjusted by relocating (e.g., sliding) the a playhead 700 along the timeline. For example, a user input can slide the playhead 700 along the timeline. In response, the character's location along the path 702 can be moved by the system to location of the path 702 that corresponds to the playhead's 700 location in the timeline.

Figure 8:
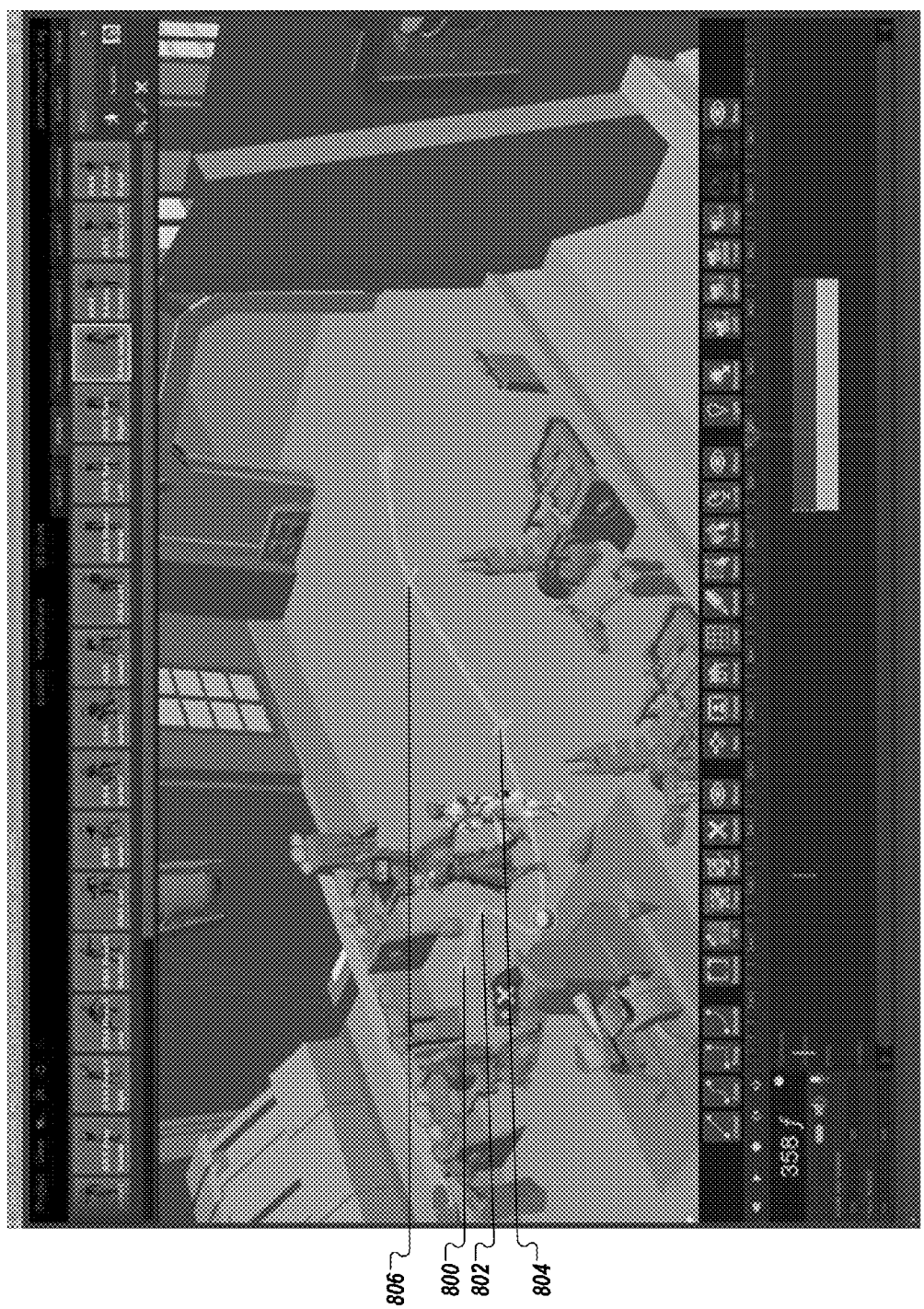

FIG. 8 shows that the shape of the curve of the path 800 can be adjusted by clicking on one or more points 802-806 on the path and moving it or them. The speed of the character along the path, however, can be preserved in such a situation. The whole path 800 can be moved at once, or several points on the path can be moved together. This can allow a user to adjust the shape of the path without changing speed.

Figure 9:
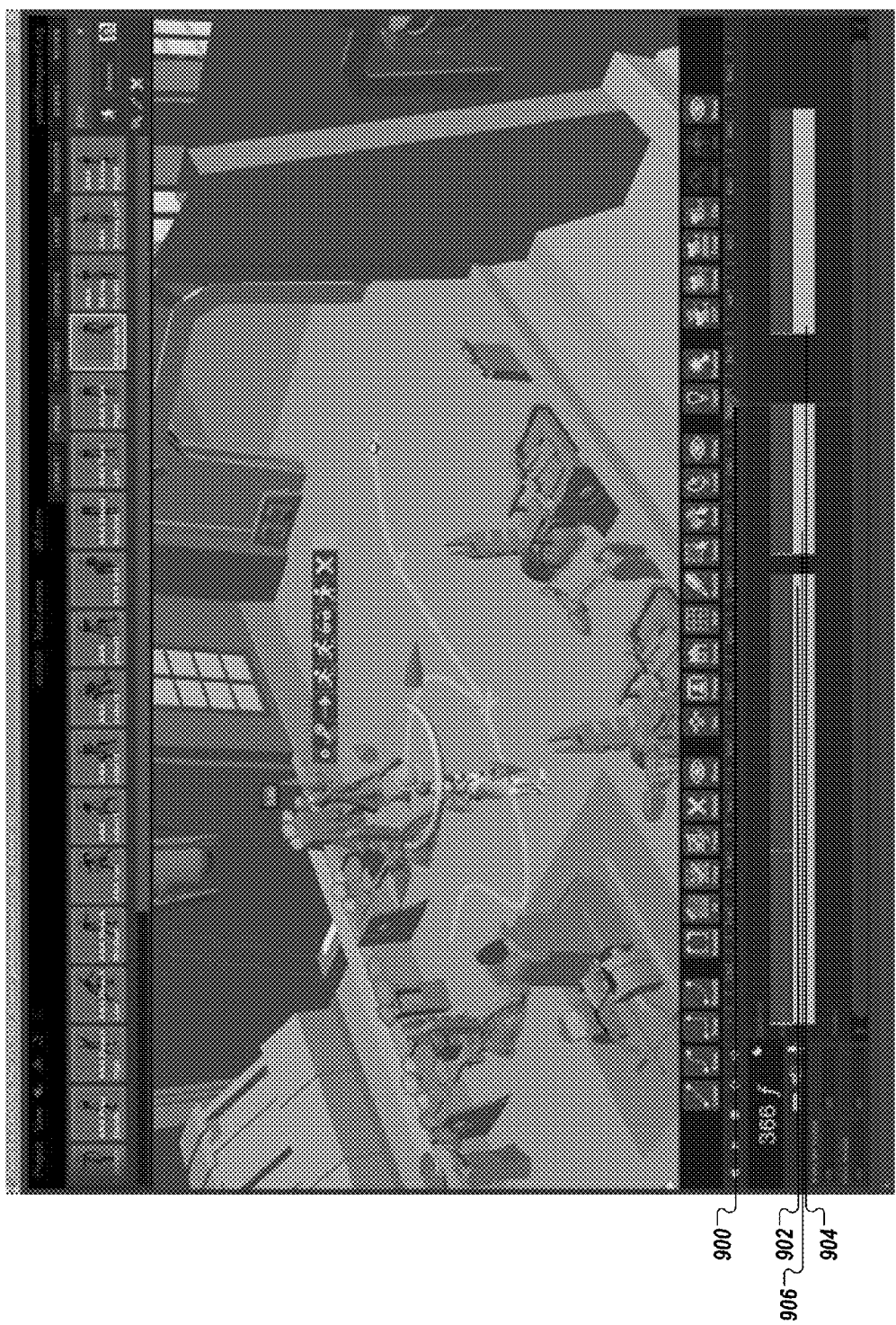

FIG. 9 shows that the playhead 900 can be moved between two pathbars 902 and 904, and that a new path 906 can be created. For example, the playhead 900 can be moved into the gap in the timeline between the two pathbars shown in FIG. 8, and a new pathbar 906 can be created at the time selected by the playhead. If the duration of the path is too long to fit within the gap of the timeline, the pathbar 906 can be indicated to the user as illegal. The user can then be presented with options to modify the path. For example, some options can include increasing the movement speed of the character so that the new pathbar fits within the gap or truncating the overlapping portions of the path so that the overlapping section is discarded.

Figure 10:
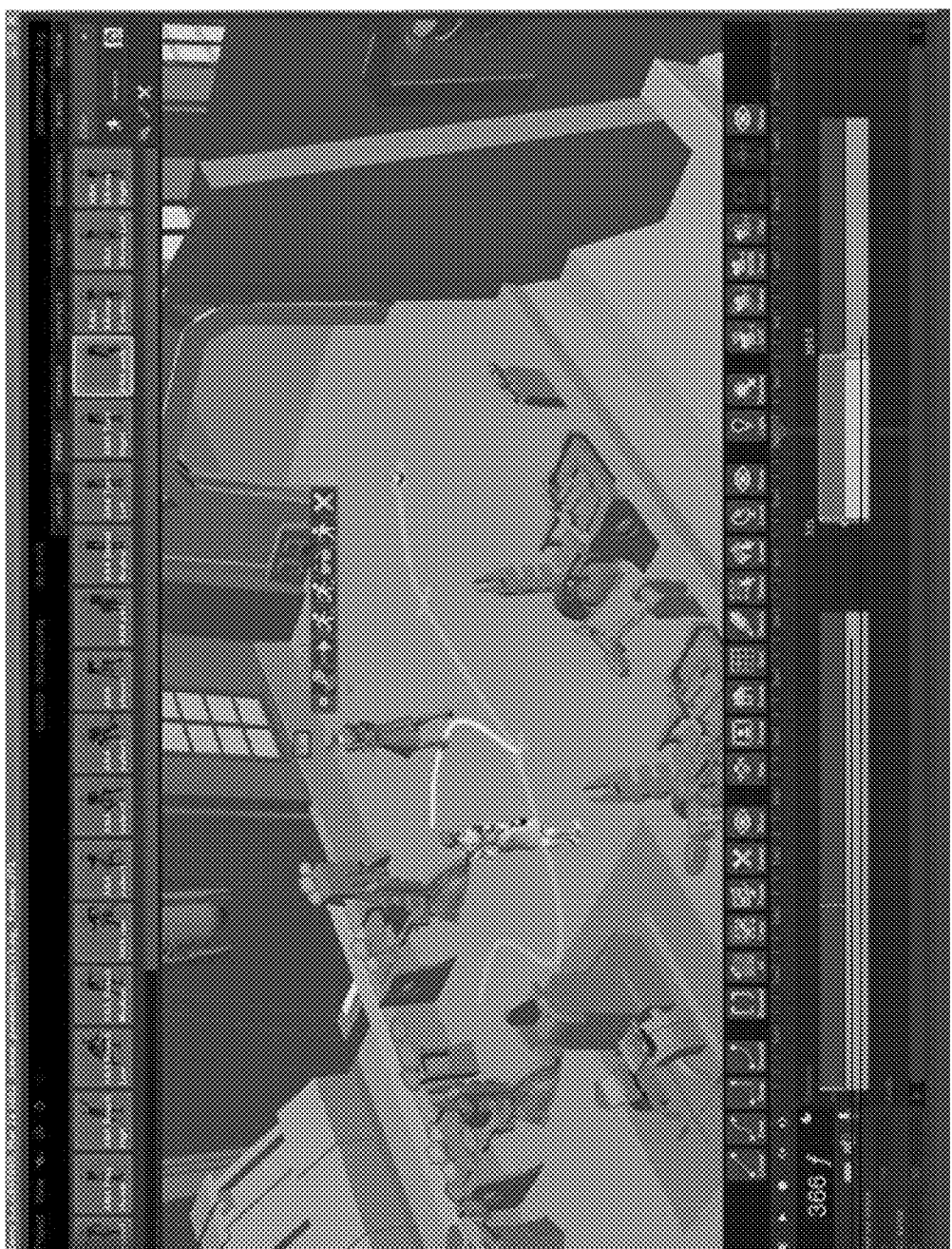

FIG. 10 shows that when moving the pathbar in the timeline, illegal areas 1000 and 1002 can be highlighted, in this case in orange. The areas can be identified as illegal because, for example, the pathbar section would overlap another pathbar section in time.

Figure 11:
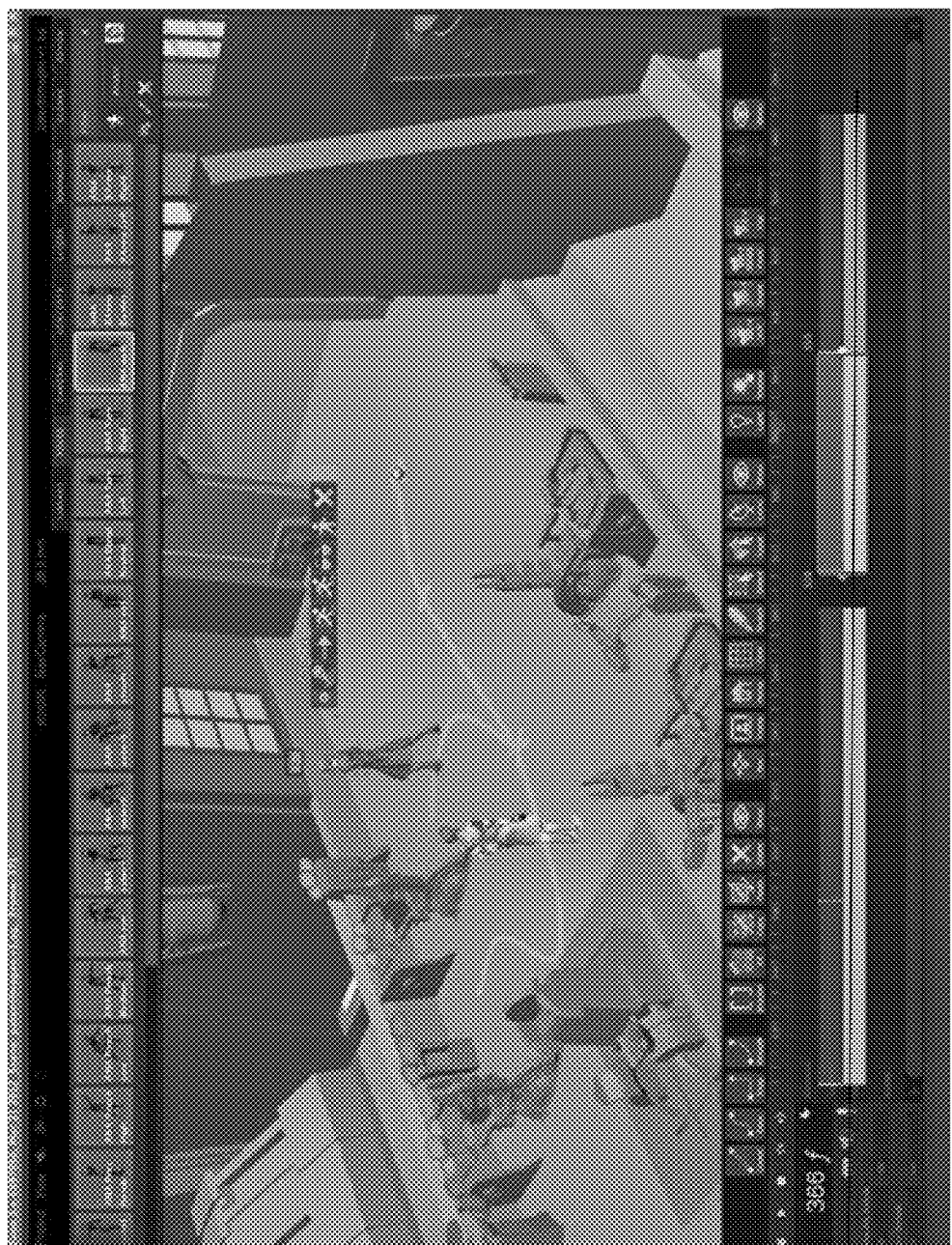

FIG. 11 shows that path sections can be retimed, that is, that character speed can be adjusted, for example by dragging either end of the pathbar. Limits to motion can be indicated by a red zone 1100. In some implementations, the system allows the user to make only legal edits in the animation. For example, the end of the block cannot be moved into the red zone in some configurations.

Figure 12A:
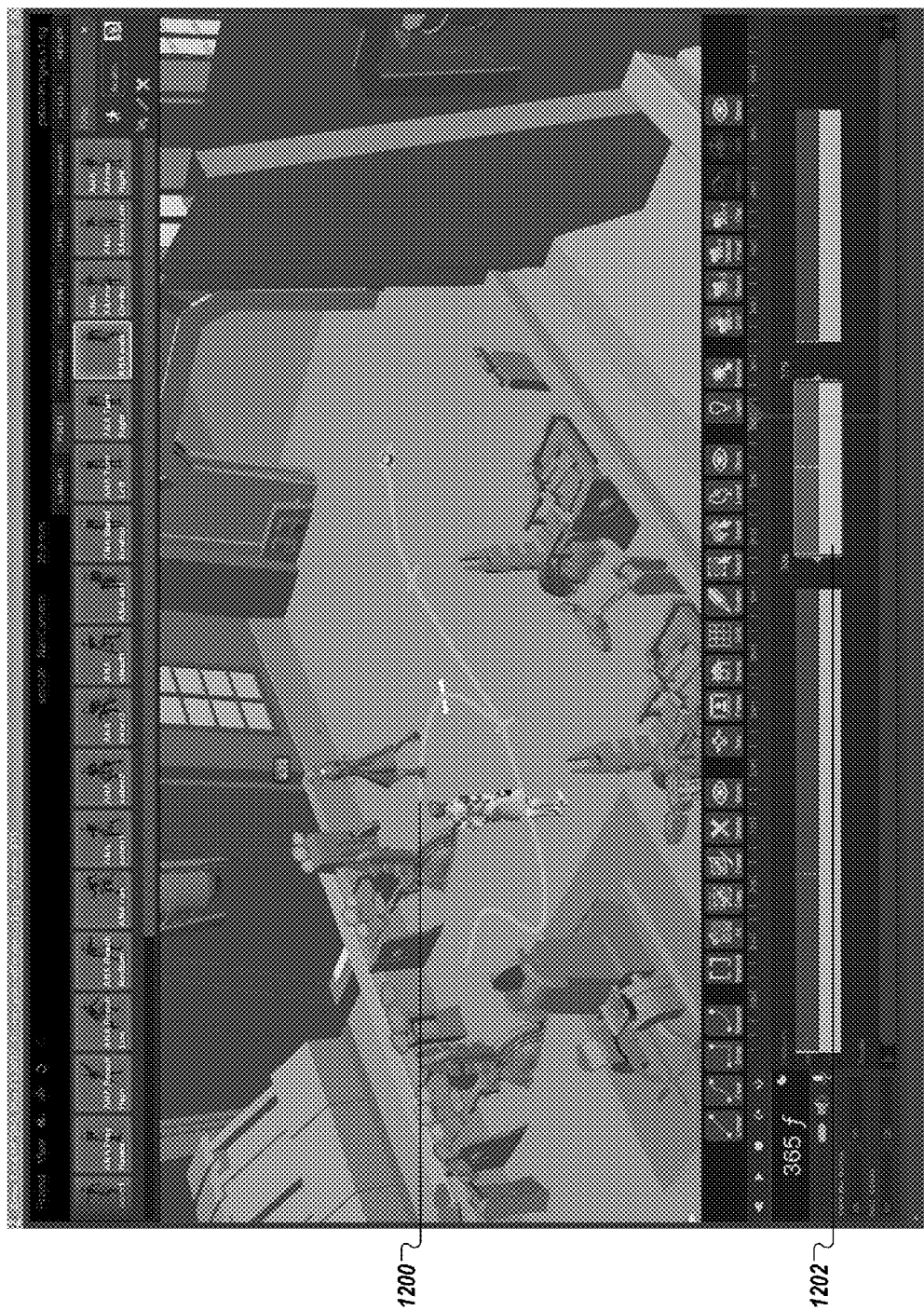
Figure 12B:
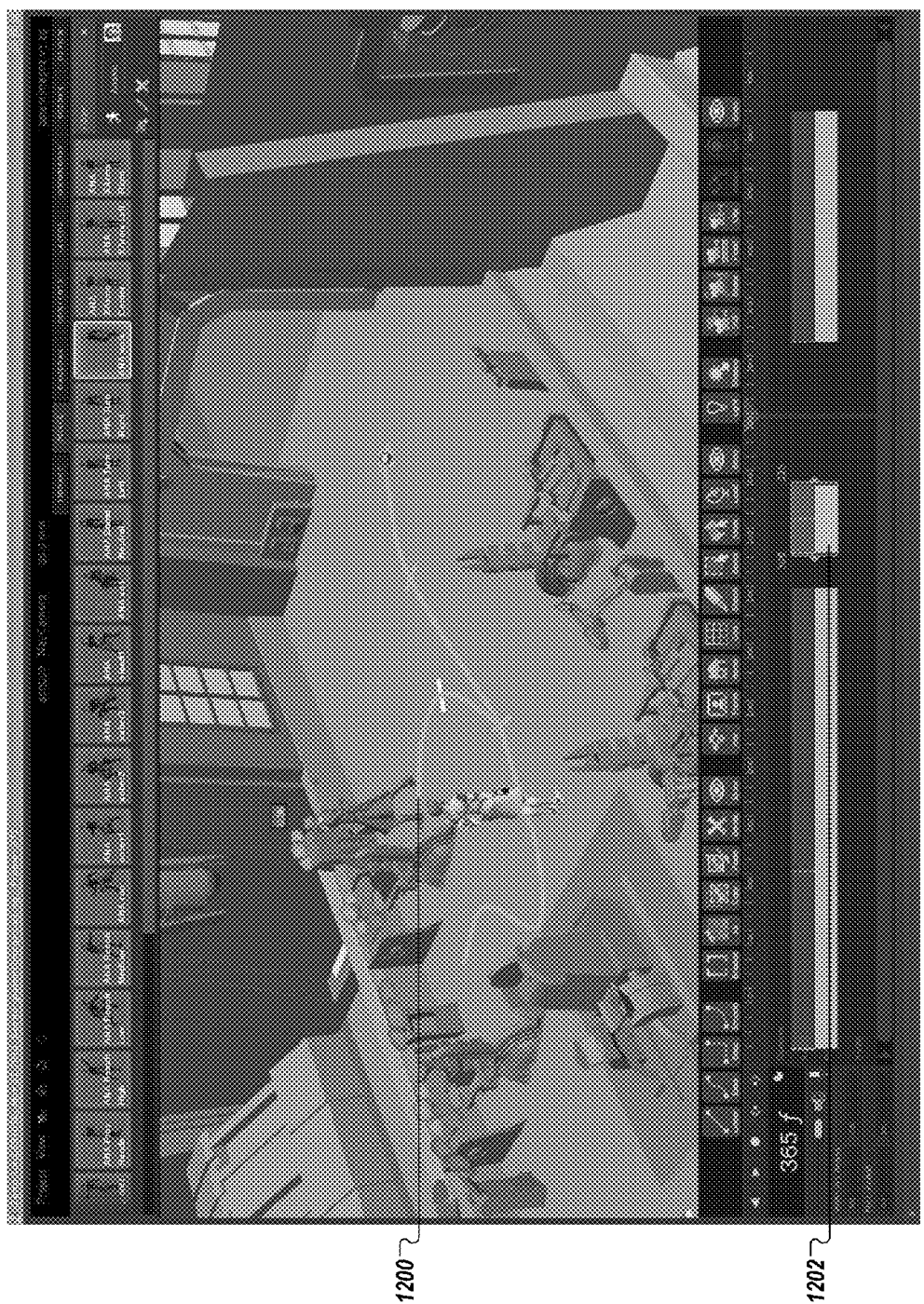

FIGS. 12a and 12b show that, in some implementations, when a new speed is set in the middle of a path 1200, the retiming of the path 1200 does not change the spatial place where the speed change occurs, only the time 1202.

Figure 13:

FIG. 13 shows that if the character 1300 is relocated (e.g., dragged) when the playhead 1302 is between pathbar 1304 and 1306 sections, new marks 1308 appear in the 3d view. The character 1300 can "pop" to those locations at those times. This "popping" represents movements of the character from one location to another without traversing a path in between. This may be useful, for example, when a character is off-camera and the director does not wish to take the time to specify movements that will not be captured by the camera.

Figure 14:
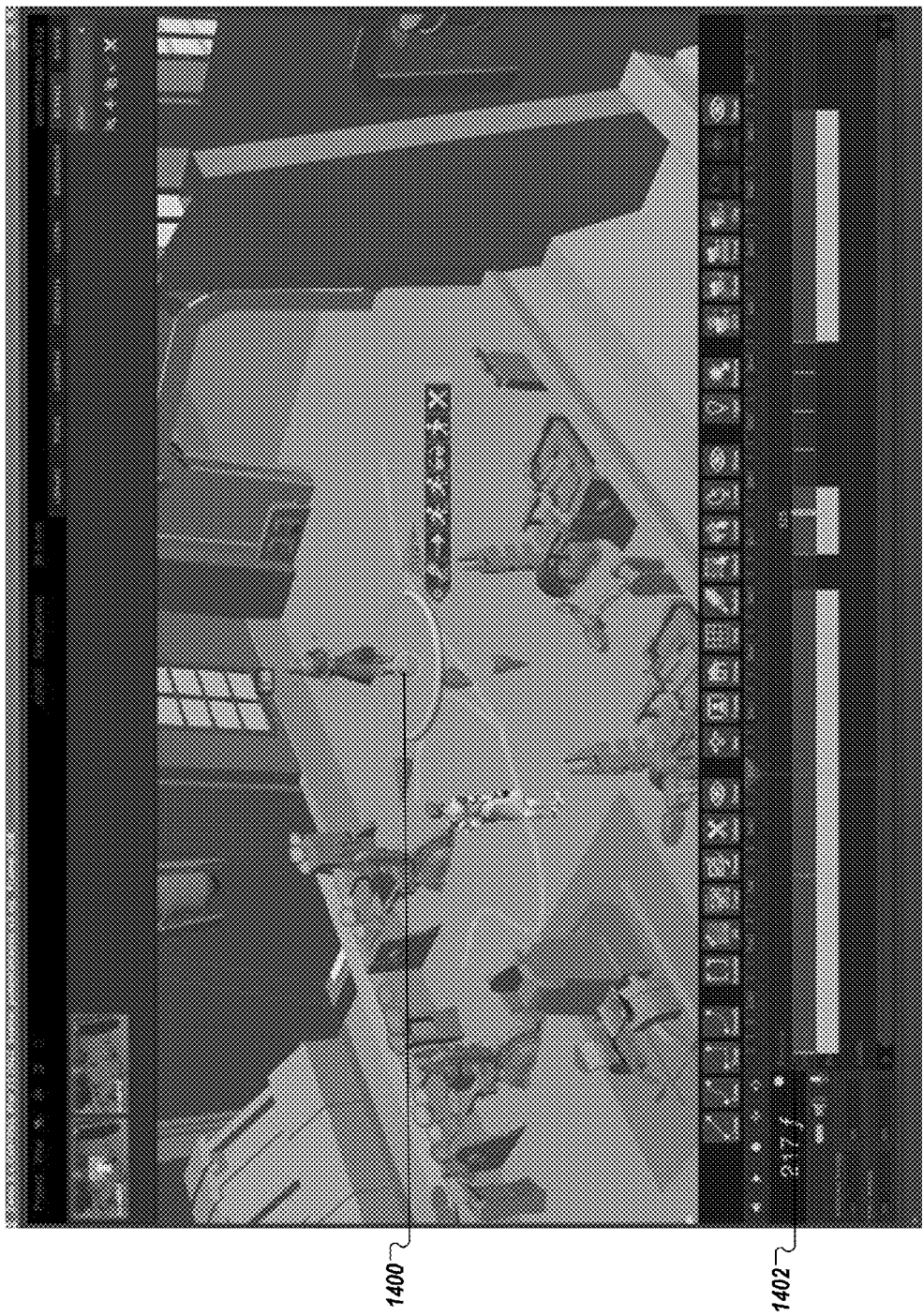
Figure 15:
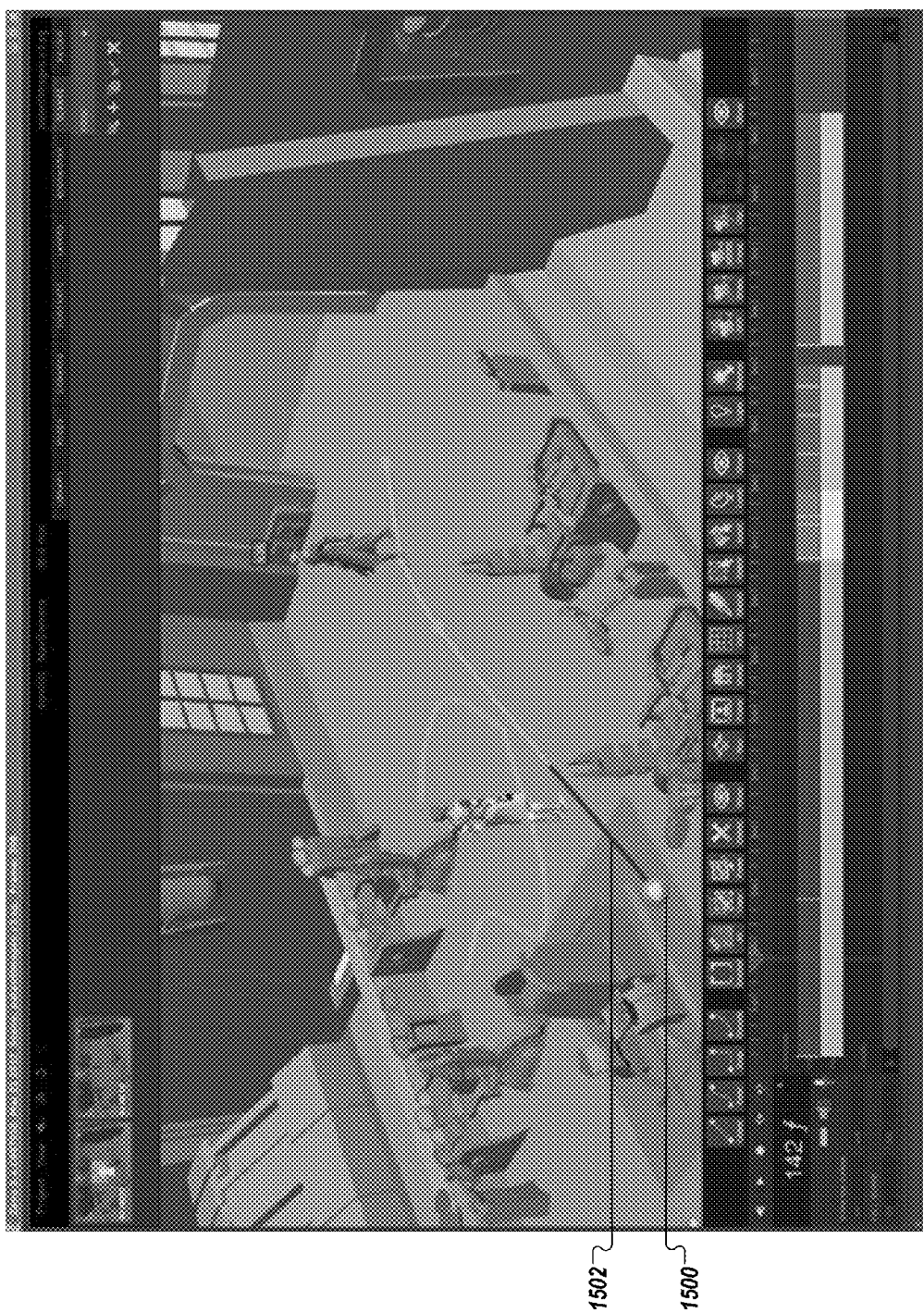

FIG. 14 shows that when the time of one of the marks 1400 is adjusted, all the places to which the mark cannot be moved can be marked 1402 (e.g., in red). FIG. 15 shows that if dragging a point 1500 on a path 1502 would cause it to overlap in time with the next section of path 1502, the affected portion of the path 1502 is highlighted (e.g., turns red) to indicate that there may be a problem. When the operation is completed, if the path 1502 was highlighted, the operation can be canceled, and the path 1502 can be reverted to the state before the user started dragging the end point 1500.

Figure 16:
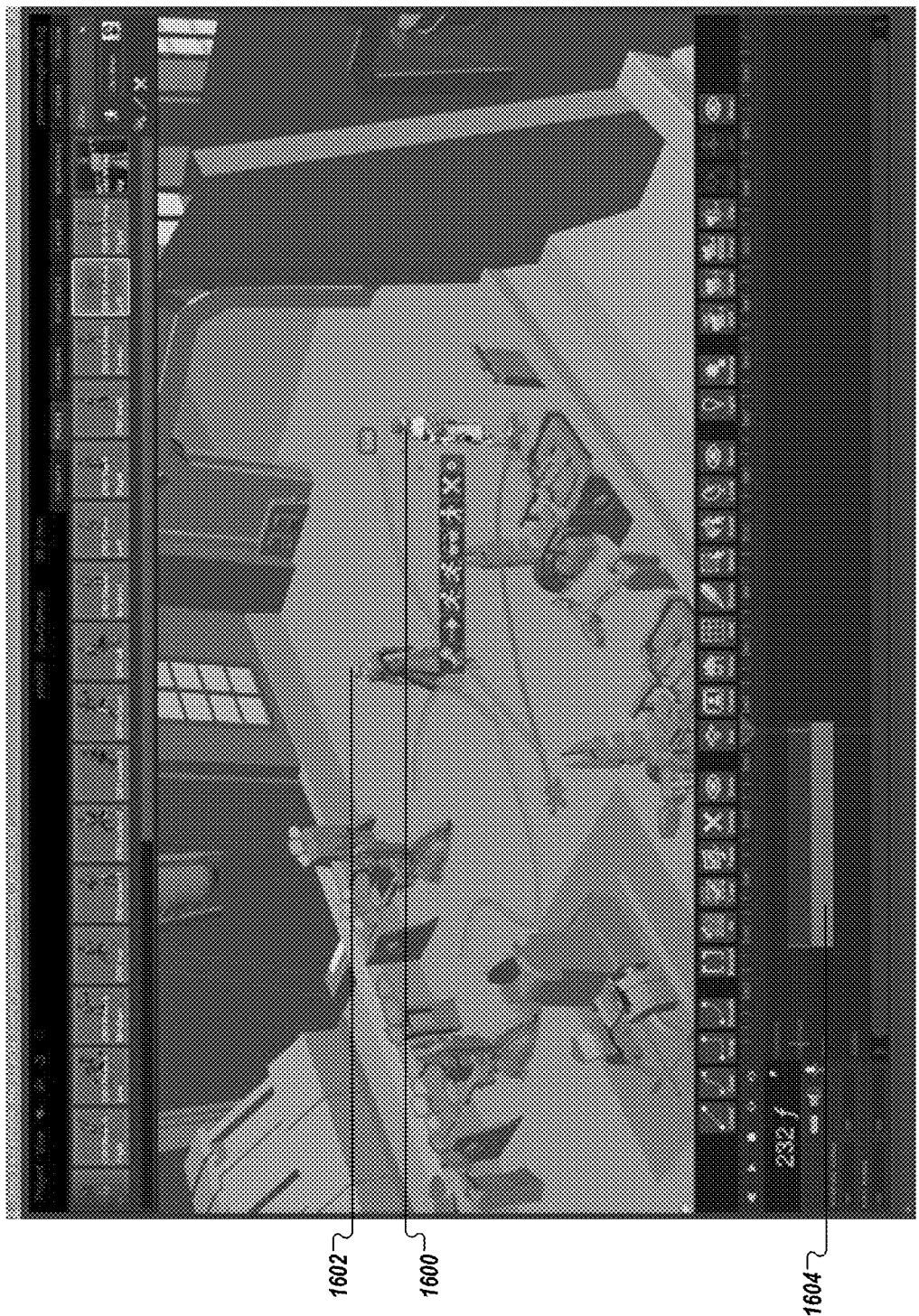

FIG. 16 shows that when there is more than one character 1600 and 1602, one or more, including all of, the character's 1600 pathbars 1604 can appear in the timeline when the character is selected. In contrast, the timeline component for the currently non-selected character 1602 is then not displayed.

Figure 17:
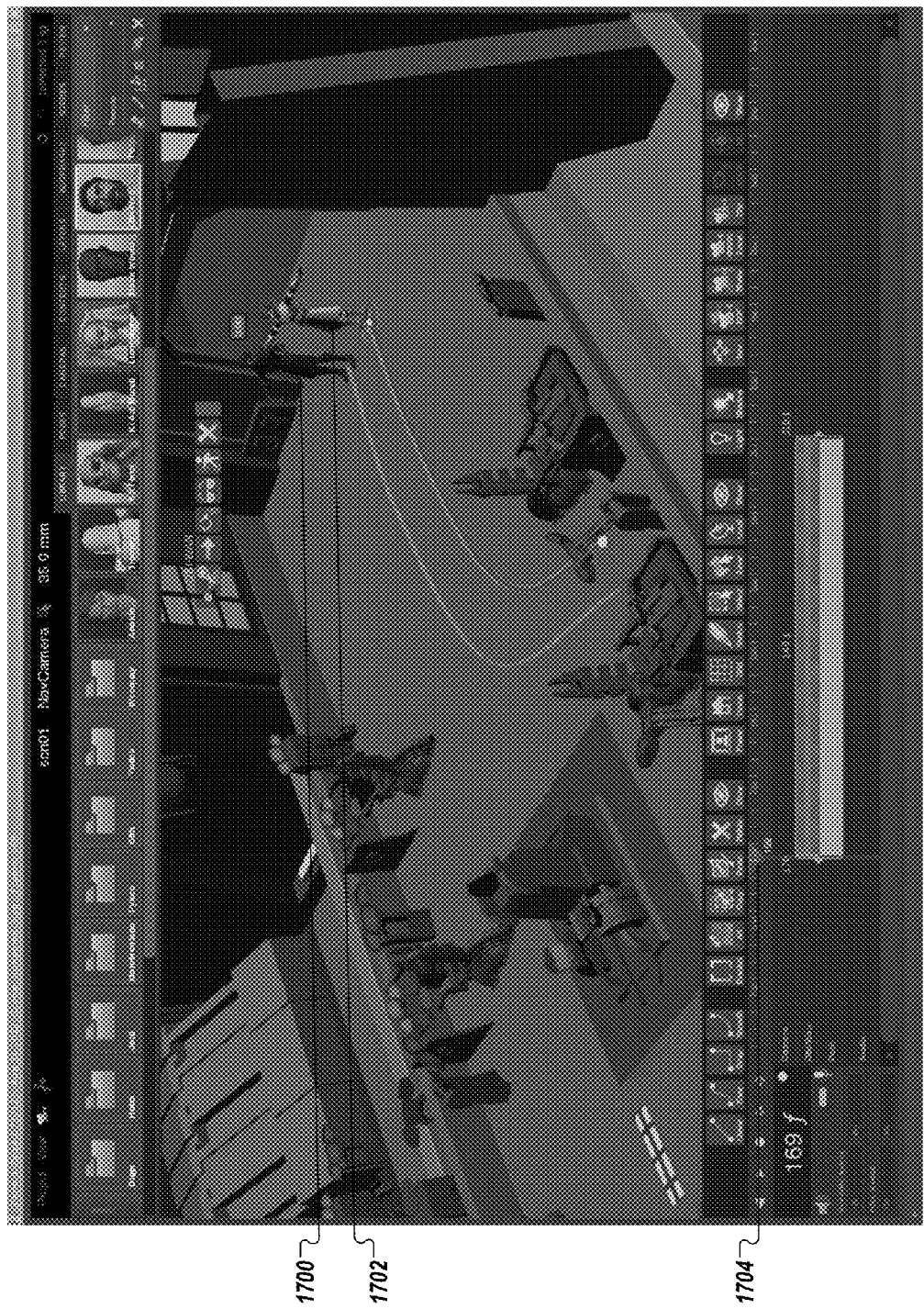
Figure 18A:
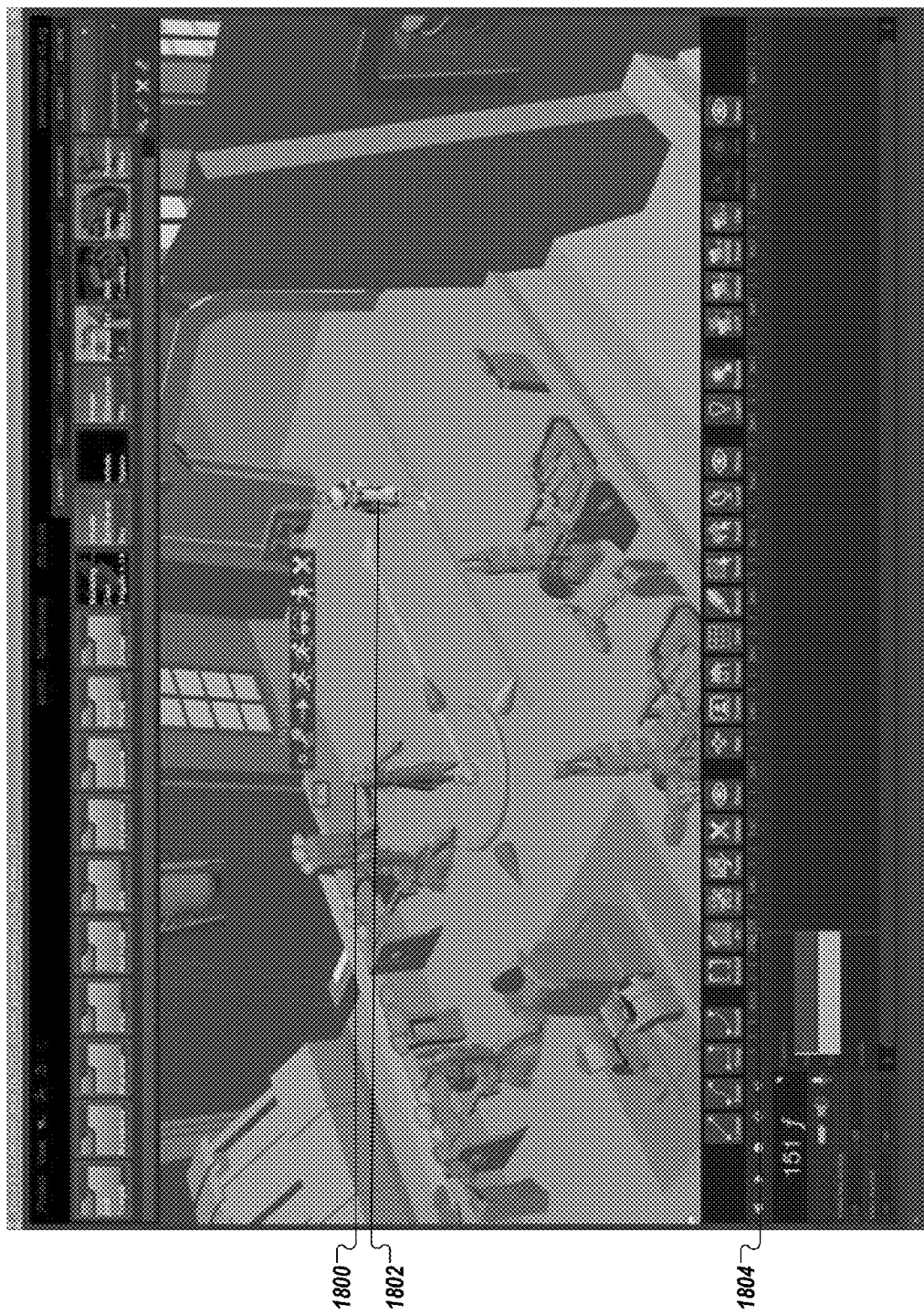
Figure 18B:
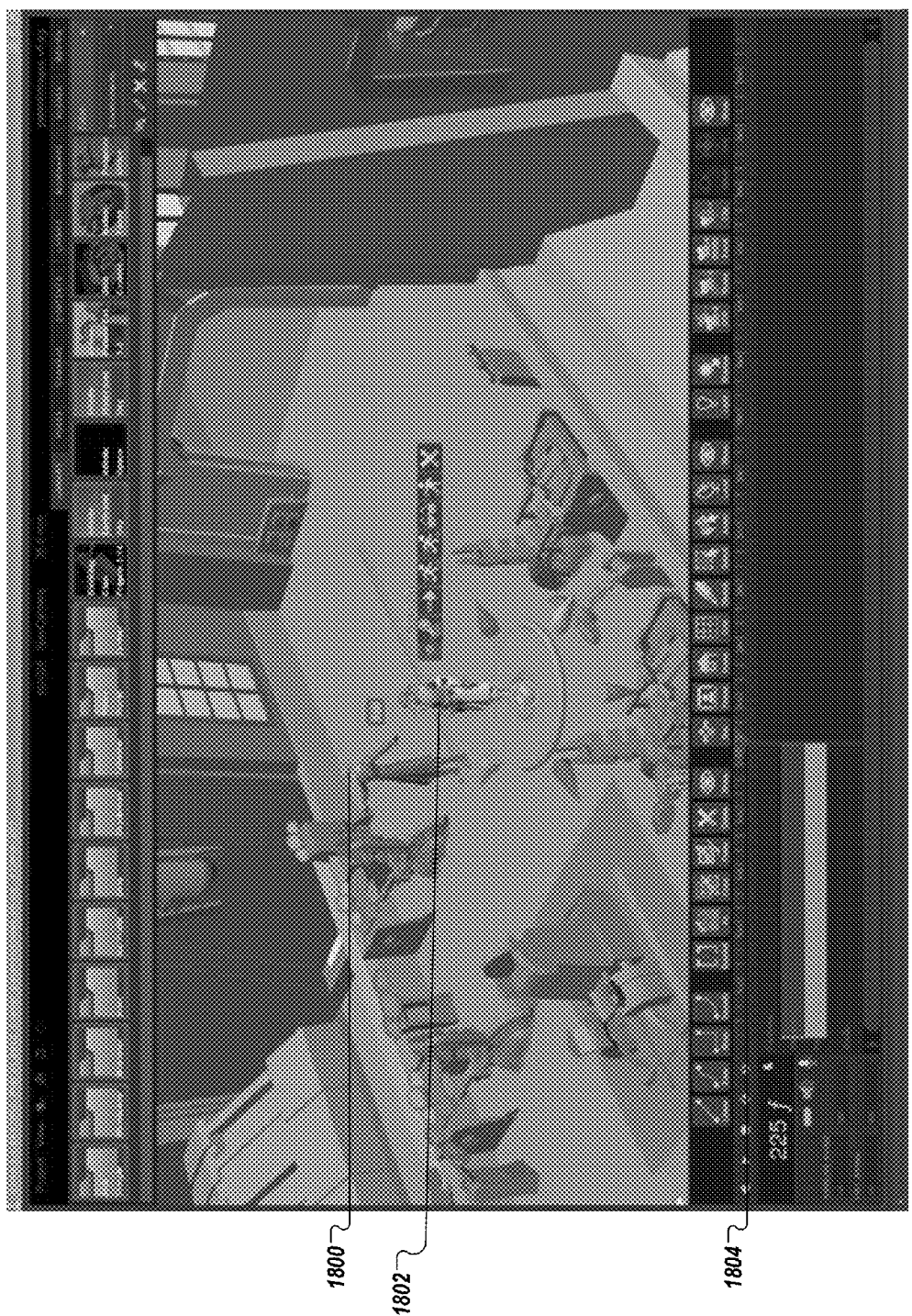
Figure 18C:
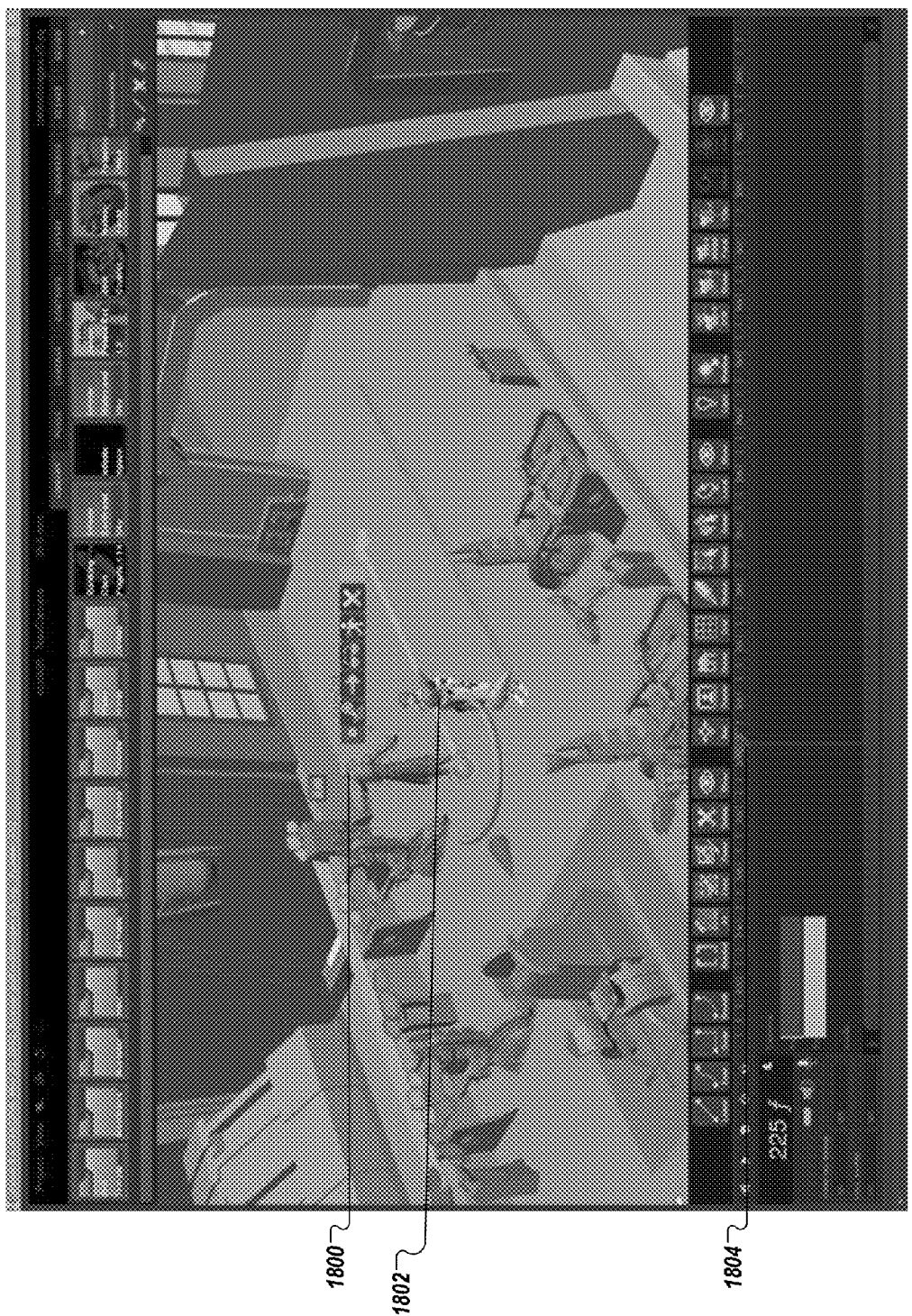
Figure 18D:
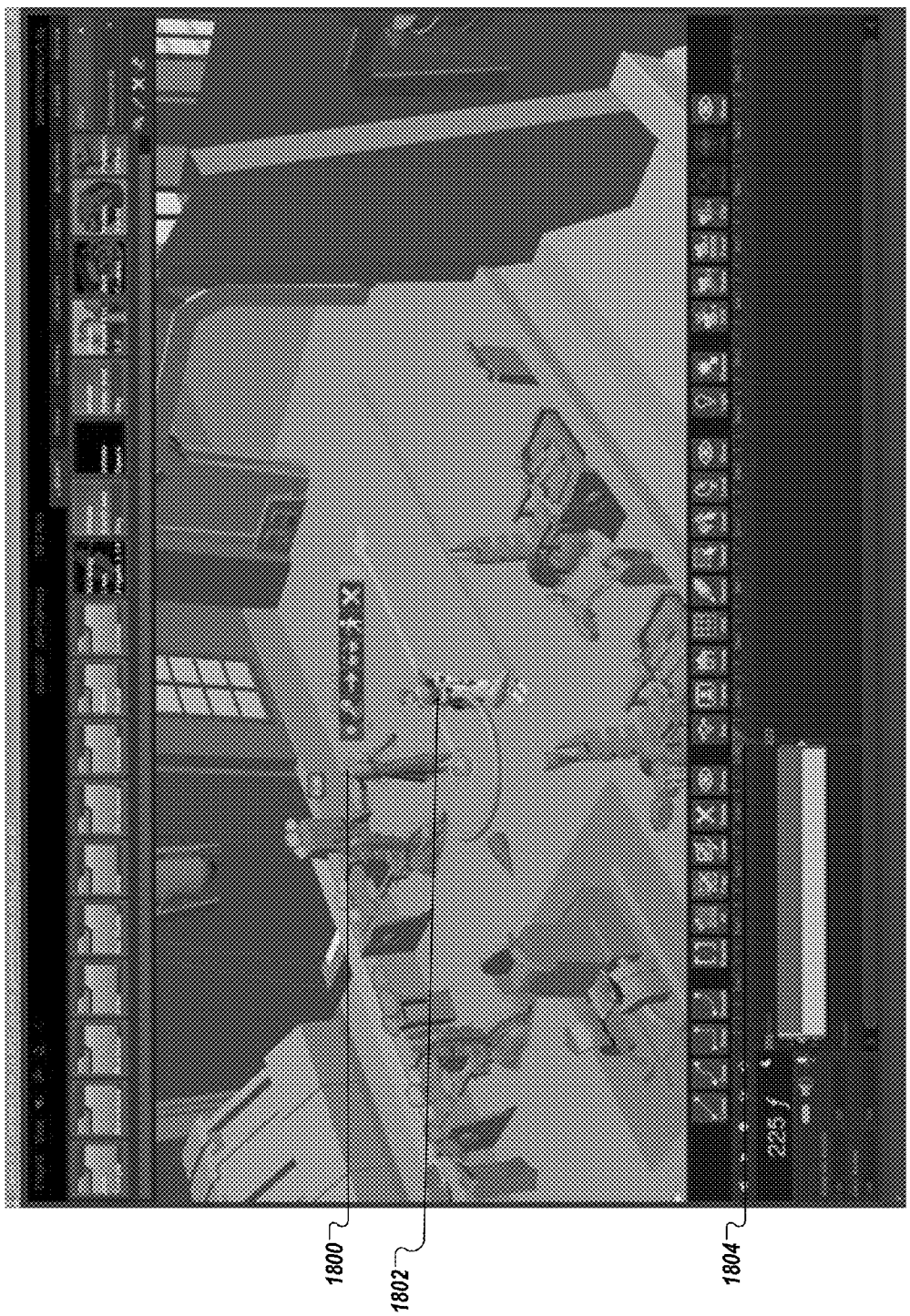

FIG. 17 shows that if the action requires two characters 1700 and 1702 to walk together, the playhead 1704 can be placed at the time the two characters 1700 and 1702 should start walking together, and the user can then relocate the time block for the character 1700 that needs to be adjusted (e.g., by dragging) near the playhead 1704 until the characters' positions line up.

FIGS. 18A, 18B, 18C and 18D show that when the characters 1800 and 1802 do not walk together, the playhead 1804 can be adjusted to where they should arrive together and then the faster character's 1800 time line can be lengthened until the two characters 1800 and 1802 are essentially synchronized.

Figure 19:
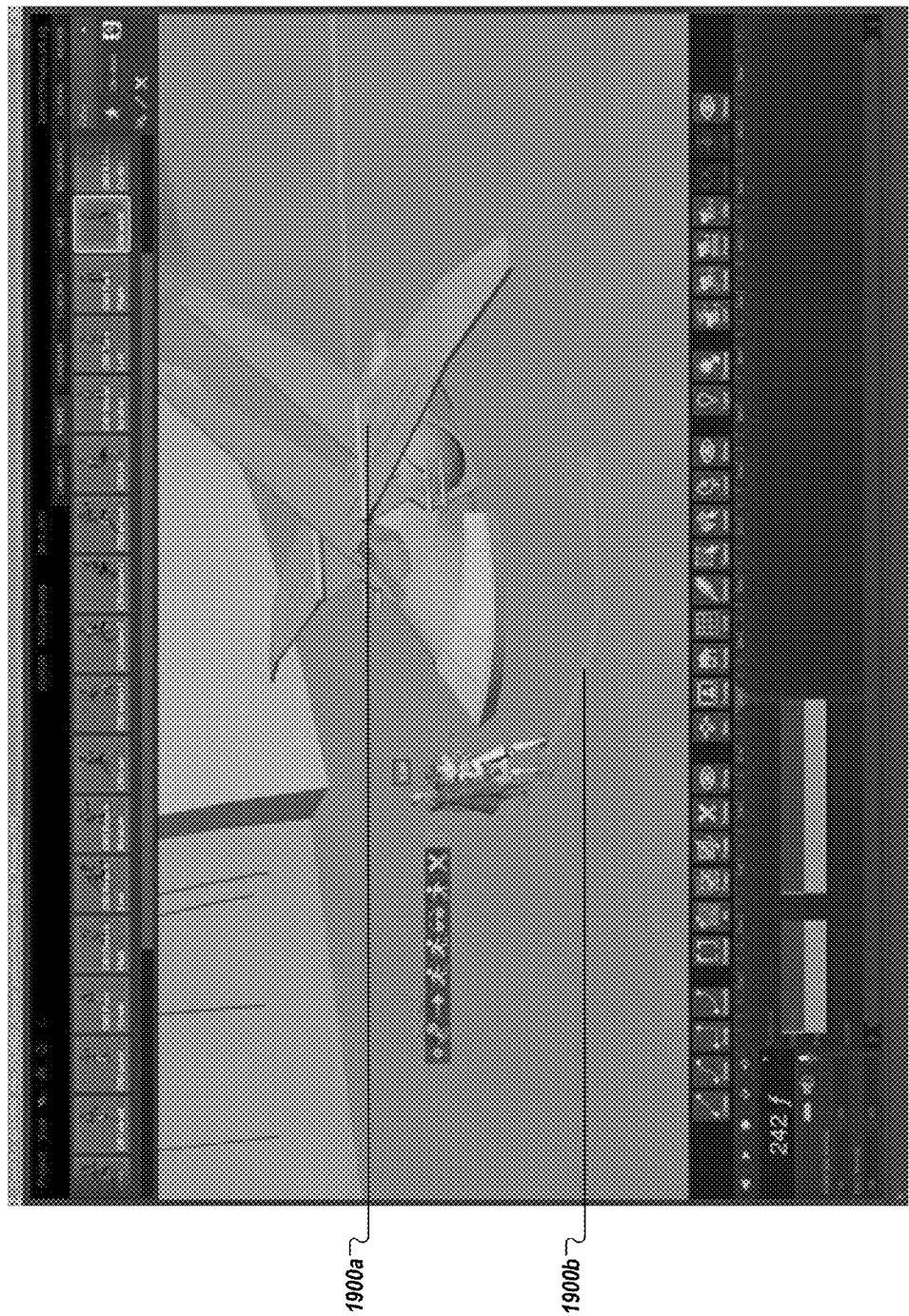

FIG. 19 shows an example of using two different frames of reference to define a single animation. In some implementations, some portions of a path 1900 may be defined in a 3D animation environment based on a first frame of reference and a second portion of the same path 1900 may be defined based on a second frame of reference. For example, a single path 1900 may be used to describe a character walking around a spaceship while the spaceship is moving, then walking onto the platform when the spaceship stops at the landing strip. This path 1900 may be split into two sections 1900*a* and 1900*b*. In the first section 1900*a*, the path's 1900 location can be defined relative to point on the spaceship. In the second section 1900*b*, describing the characters movement on the platform, the path's 1900 location can be defined relative to a point on the station, from, for example an origin point of the 3D animation environment.

Figure 20:
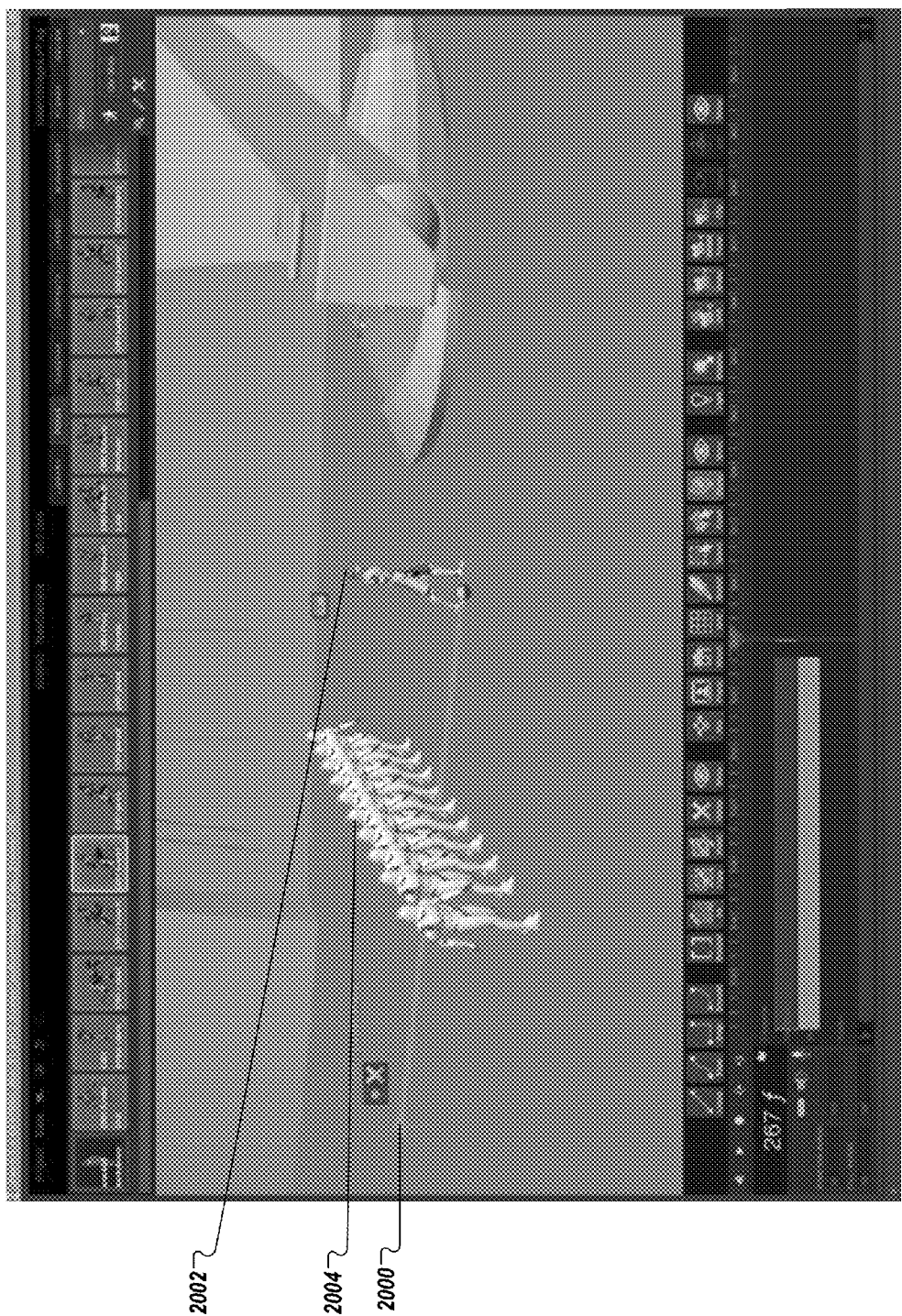

FIG. 20 shows an example of offsetting characters from a path both spatially and temporally.

In another configuration, one or more character position(s) may be defined temporally relative to another character, and spatially relative to the path itself. A path 2000 in the 3D environment can be created for a lead character 2002, and each of other characters 2004 can be defined to have a constant temporal offset from the lead character 2002. In this case, as the lead character 2002 moves, the other characters 2004 also move through the 3D environment, while maintaining essentially the same positions relative to the lead character 2002. These characters 2004 all start moving later than the lead character 2002, and are each also offset spatially from the line of the path 2000.

Figure 21:
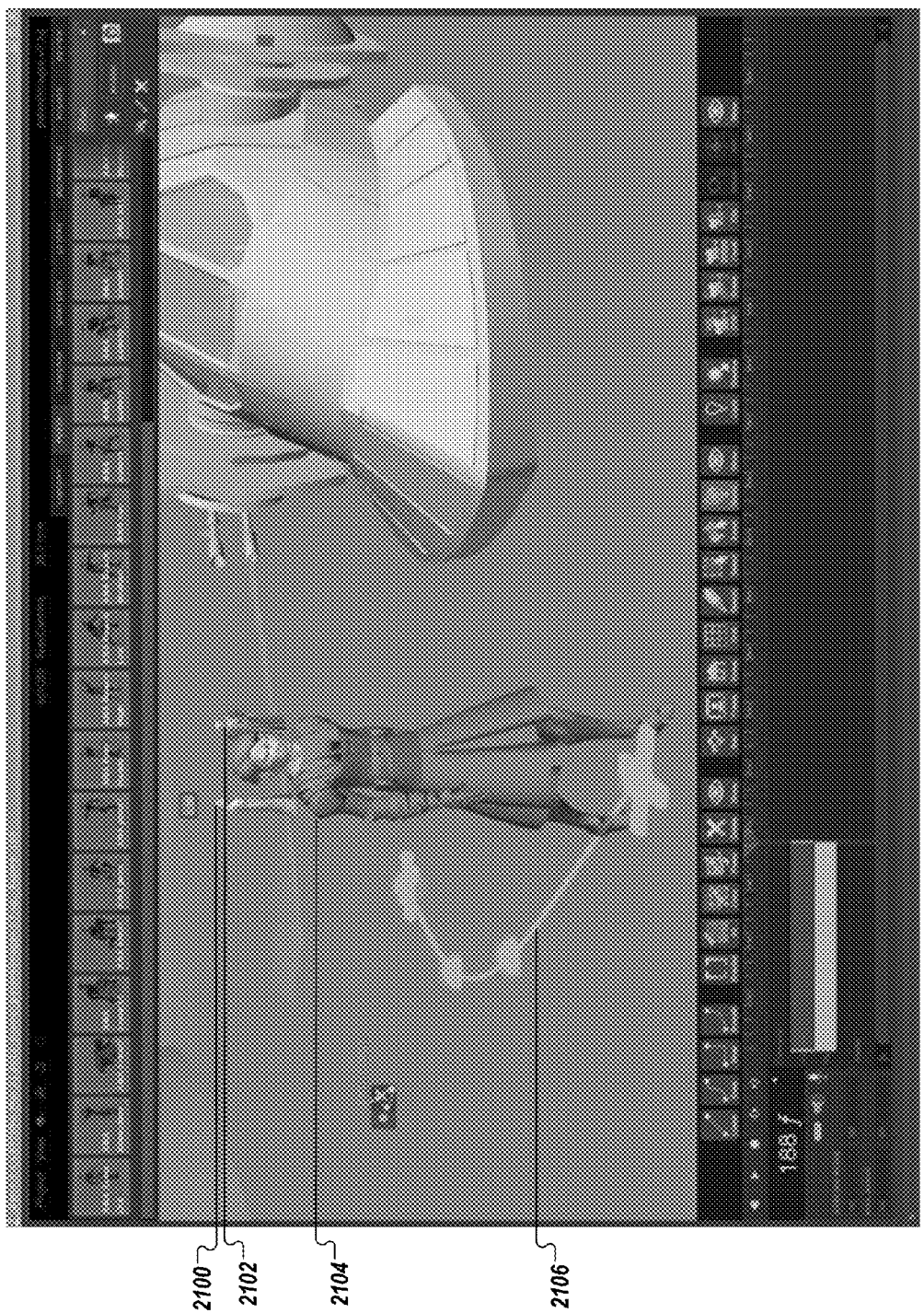

FIG. 21 shows yet another example of a character path defined relative to another character, one character can ride another. For example, a cartoon angel 2100 and demon 2102 can ride on the shoulders of a character 1204. These characters can move around the shoulders of a larger character 1204 according to a path 1206 that is described relative to a point on the larger characters. A change to the larger character's 1204 path 1206 need not propagate to the angel and demon characters. However, the angel and demon characters can automatically remain on the larger character after the edit as their path is defined relative to the moving larger character.

Figure 22:
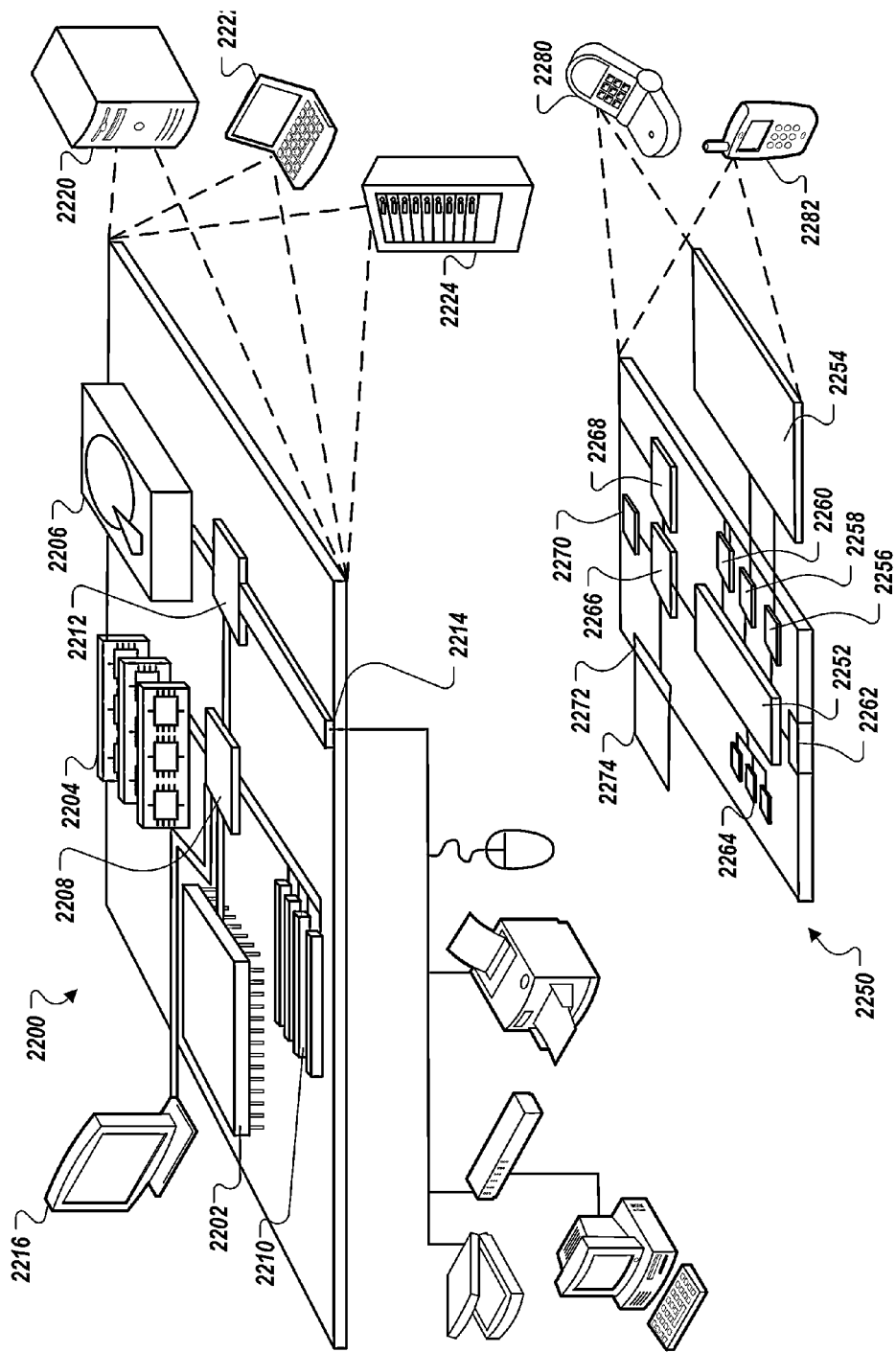
FIG. 22 is a schematic diagram that shows an example of a computing system that can be used in connection with computer-implemented methods and systems described in this document.

FIG. 22 shows an example of a computing device 2200 and a mobile computing device that can be used to implement the techniques described here. The computing device 2200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 2200 includes a processor 2202, a memory 2204, a storage device 2206, a high-speed interface 2208 connecting to the memory 2204 and multiple high-speed expansion ports 2210, and a low-speed interface 2212 connecting to a low-speed expansion port 2214 and the storage device 2206. Each of the processor 2202, the memory 2204, the storage device 2206, the high-speed interface 2208, the high-speed expansion ports 2210, and the low-speed interface 2212, are interconnected using various busses, and may be mounted on a common motherboard or in other manners as appropriate. The processor 2202 can process instructions for execution within the computing device 2200, including instructions stored in the memory 2204 or on the storage device 2206 to display graphical information for a GUI on an external input/output device, such as a display 2216 coupled to the high-speed interface 2208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 2204 stores information within the computing device 2200. In some implementations, the memory 2204 is a volatile memory unit or units. In some implementations, the memory 2204 is a non-volatile memory unit or units. The memory 2204 may also be another form of computer-readable medium, such as a magnetic or optical disk.

The storage device 2206 is capable of providing mass storage for the computing device 2200. In some implementations, the storage device 2206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 2204, the storage device 2206, or memory on the processor 2202.

The high-speed interface 2208 manages bandwidth-intensive operations for the computing device 2200, while the low-speed interface 2212 manages lower bandwidth-intensive operations. Such allocation of functions is exemplary only. In some implementations, the high-speed interface 2208 is coupled to the memory 2204, the display 2216 (e.g., through a graphics processor or accelerator), and to the high-speed expansion ports 2210, which may accept various expansion cards (not shown). In the implementation, the low-speed interface 2212 is coupled to the storage device 2206 and the low-speed expansion port 2214. The low-speed expansion port 2214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2200 may be implemented in a number of different forms, as shown in the figure. For example, it may be implemented as a standard server 2220, or multiple times in a group of such servers. In addition, it may be implemented in a personal computer such as a laptop computer 2222. It may also be implemented as part of a rack server system 2224. Alternatively, components from the computing device 2200 may be combined with other components in a mobile device (not shown), such as a mobile computing device 2250. Each of such devices may contain one or more of the computing device 2200 and the mobile computing device 2250, and an entire system may be made up of multiple computing devices communicating with each other.

The mobile computing device 2250 includes a processor 2252, a memory 2264, an input/output device such as a display 2254, a communication interface 2266, and a transceiver 2268, among other components. The mobile computing device 2250 may also be provided with a storage device, such as a micro-drive or other device, to provide additional storage. Each of the processor 2252, the memory 2264, the display 2254, the communication interface 2266, and the transceiver 2268, are interconnected using various buses, and several of the components may be mounted on a common motherboard or in other manners as appropriate.

The processor 2252 can execute instructions within the mobile computing device 2250, including instructions stored in the memory 2264. The processor 2252 may be implemented as a chipset of chips that include separate and multiple analog and digital processors. The processor 2252 may provide, for example, for coordination of the other components of the mobile computing device 2250, such as control of user interfaces, applications run by the mobile computing device 2250, and wireless communication by the mobile computing device 2250.

The processor 2252 may communicate with a user through a control interface 2258 and a display interface 2256 coupled to the display 2254. The display 2254 may be, for example, a TFT (Thin-Film-Transistor Liquid Crystal Display) display or an OLED (Organic Light Emitting Diode) display, or other appropriate display technology. The display interface 2256 may comprise appropriate circuitry for driving the display 2254 to present graphical and other information to a user. The control interface 2258 may receive commands from a user and convert them for submission to the processor 2252. In addition, an external interface 2262 may provide communication with the processor 2252, so as to enable near area communication of the mobile computing device 2250 with other devices. The external interface 2262 may provide, for example, for wired communication in some implementations, or for wireless communication in other implementations, and multiple interfaces may also be used.

The memory 2264 stores information within the mobile computing device 2250. The memory 2264 can be implemented as one or more of a computer-readable medium or media, a volatile memory unit or units, or a non-volatile memory unit or units. An expansion memory 2274 may also be provided and connected to the mobile computing device 2250 through an expansion interface 2272, which may include, for example, a SIMM (Single In Line Memory Module) card interface. The expansion memory 2274 may provide extra storage space for the mobile computing device 2250, or may also store applications or other information for the mobile computing device 2250. Specifically, the expansion memory 2274 may include instructions to carry out or supplement the processes described above, and may include secure information also. Thus, for example, the expansion memory 2274 may be provide as a security module for the mobile computing device 2250, and may be programmed with instructions that permit secure use of the mobile computing device 2250. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 2264, the expansion memory 2274, or memory on the processor 2252. In some implementations, the computer program product can be received in a propagated signal, for example, over the transceiver 2268 or the external interface 2262.

The mobile computing device 2250 may communicate wirelessly through the communication interface 2266, which may include digital signal processing circuitry where necessary. The communication interface 2266 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 2268 using a radio-frequency. In addition, short-range communication may occur, such as using a Bluetooth, WiFi, or other such transceiver (not shown). In addition, a GPS (Global Positioning System) receiver module 2270 may provide additional navigation- and location-related wireless data to the mobile computing device 2250, which may be used as appropriate by applications running on the mobile computing device 2250.

The mobile computing device 2250 may also communicate audibly using an audio codec 2260, which may receive spoken information from a user and convert it to usable digital information. The audio codec 2260 may likewise generate audible sound for a user, such as through a speaker, e.g., in a handset of the mobile computing device 2250. Such sound may include sound from voice telephone calls, may include recorded sound (e.g., voice messages, music files, etc.) and may also include sound generated by applications operating on the mobile computing device 2250.

The mobile computing device 2250 may be implemented in a number of different forms, as shown in the figure. For example, it may be implemented as a cellular telephone 2280. It may also be implemented as part of a smart-phone 2282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Some implementations may include some or all of the following features: A computer program product tangibly embodied in a computer-readable storage medium and comprising instructions that when executed by a processor perform a method for animating assets, the method comprising:
    generating a 3D animation environment that includes at least one animation object;
    assigning, to the animation object, a first movement speed and a second movement speed for the animation object in the 3D animation environment;
    generating a path through the 3D animation environment; and
    assigning the first movement speed to a first portion of the path and the second movement speed to a second portion of the path;
    generating an animation sequence that includes the animation object moving along the first portion of the path at the first movement speed and moving along the second portion of the path at the second movement speed.

A computer program product tangibly embodied in a computer-readable storage medium and comprising instructions that when executed by a processor perform a method for animating assets, the method comprising:
    generating a 3D animation environment that contains at least one animation object;
    assigning, to the animation object, a movement speed for the animation object in the 3D animation environment;
    generating a path through the 3D animation environment;
    generating an animation sequence that includes the animation object moving along at least a portion the path at the movement speed;
    identifying an animation rule that is violated by the animation sequence; and
    visually indicating the rule violation in a graphical user interface configured to receive user input to correct the rule violation.

A method comprising:
    assigning the animation object to a first location in the 3D animation environment at a first time and to a second location in the 3D animation environment at a second time;
    calculating the speed at which the animation object must move to move from the first location at the first time to the second location at the second time;
    responsive to determining that the speed is greater than a maximum movement speed associated with the animation object, indicating that the speed is greater than the maximum movement speed.

A method comprising:
    generating a second path through the 3D animation environment; and
    responsive to determining that the path and the second path conflict, indicating that the path and the second path conflict.

What is claimed is:

1. A computer program product embodied in a non-transitory computer-readable storage medium and comprising instructions that when executed by a processor perform a method for animating assets, the method comprising:
    generating a 3D animation environment that includes at least one animation object;
    receiving a first single user-specified value for a first movement speed for moving the animation object in the 3D animation environment and a second single user-specified value for a second movement speed for moving the animation object in the 3D animation environment;
    generating an animation path in the 3D animation environment, the animation path containing at least first and second waypoints; and
    generating, after generating the animation path, an animation sequence by:
        identifying a first section of the animation path connected to the first waypoint;
        responsive to identifying the first section, generating a first animation of the animation object in which the animation object moves along the first section of the animation path at the first user-specified value for the first movement speed;
        identifying a spatial gap in the animation path between the first and second waypoints;
        responsive to identifying the spatial gap, generating a second animation of the animation object in which the animation object moves, by keyframe animation, from the first waypoint to the second waypoint;
        identifying a second section of the animation path connected to the second waypoint; and
        responsive to identifying the second section of the animation path, generating a third animation of the animation object in which the animation object moves along at least a second portion of the animation path that begins at the second waypoint at the second user-specified value of the second movement speed.

2. The method of claim 1, the method further comprising:
    after generating the first animation, the second animation, and the third animation, editing the animation path; and
    generating, based on at least the edited animation path, a fourth animation that includes the animation object moving along at least a portion the edited animation path at the first user-specified value of the first movement speed.

3. The method of claim 1, the method further comprising indicating the time in the animation sequence when the animation object will arrive at a point in the animation path.

4. The method of claim 1, wherein an edit to a location on the animation path results in i) a playhead moving to a corresponding location on an animation timeline and ii) a second object in the 3D animation environment moving to a location in the 3D animation environment that is associated with the second object at the corresponding location of the animation timeline.

5. The method of claim 1, wherein one portion of the animation path is defined in the 3D animation environment based on a first frame of reference and another portion of the animation path is defined in the 3D animation environment based on a second frame of reference.

6. A system comprising:
one or more processors; and
a computer-readable medium having stored therein instructions that when executed generate an animation system configured to perform operations comprising:
generating a 3D animation environment that includes at least one animation object;
receiving a first single user-specified value for a first movement speed for moving the animation object in the 3D animation environment and a second single user-specified value for a second movement speed for moving the animation object in the 3D animation environment;
generating an animation path in the 3D animation environment, the animation path containing at least first and second waypoints; and
generating, after generating the animation path, an animation sequence by:
identifying a first section of the animation path connected to the first waypoint;
responsive to identifying the first section, generating a first animation of the animation object in which the animation object moves along the first section of the animation path at the first user-specified value for the first movement speed;
identifying a spatial gap in the animation path between the first and second waypoints;
responsive to identifying the spatial gap, generating a second animation of the animation object in which the animation object moves, by keyframe animation, from the first waypoint to the second waypoint;
identifying a second section of the animation path connected to the second waypoint; and
responsive to identifying the second section of the animation path, generating a third animation of the animation object in which the animation object moves along at least a second portion of the animation path that begins at the second waypoint at the user-specified value of the movement speed.

7. The system of claim 6, the operations further comprising:
after generating the first animation, the second animation, and the third animation, editing the animation path; and
generating, based on at least the edited animation path, a fourth animation that includes the animation object moving along at least a portion the edited animation path at the first user-specified value for the first movement speed.

8. The system of claim 6, the operations further comprising indicating the time in the animation sequence when the animation object will arrive at a point in the animation path.

9. The system of claim 6, wherein an edit to a location on the animation path results in i) a playhead moving to a corresponding location on an animation timeline and ii) a second object in the 3D animation environment moving to a location in the 3D animation environment that is associated with the second object at the corresponding location of the animation timeline.

10. The system of claim 6, wherein one portion of the animation path is defined in the 3D animation environment based on a first frame of reference and another portion of the animation path is defined in the 3D animation environment based on a second frame of reference.

11. A non-transitory computer-readable medium having stored therein instructions that when executed perform a method comprising:
generating a 3D animation environment that includes at least one animation object;
receiving a first single user-specified value for a first movement speed for moving the animation object in the 3D animation environment and a second single user-specified value for a second movement speed for moving the animation object in the 3D animation environment;
generating an animation path in the 3D animation environment, the animation path containing at least first and second waypoints; and
generating, after generating the animation path, an animation sequence by:
identifying a first section of the animation path connected to the first waypoint;
responsive to identifying the first section, generating a first animation of the animation object in which the animation object moves along the first section of the animation path at the first user-specified value for the first movement speed;
identifying a spatial gap in the animation path between the first and second waypoints;
responsive to identifying the spatial gap, generating a second animation of the animation object in which the animation object moves, by keyframe animation, from the first waypoint to the second waypoint;
identifying a second section of the animation path connected to the second waypoint; and
responsive to identifying the second section of the animation path, generating a third animation of the animation object in which the animation object moves along at least a second portion of the animation path that begins at the second waypoint at the second user-specified value of the second movement speed.

12. The non-transitory computer-readable medium of claim 11, the method further comprising:
after generating the first animation, the second animation, and the third animation, editing the animation path; and
generating, based on at least the edited animation path, a fourth animation that includes the animation object moving along at least a portion the edited animation path at the first user-specified value for the first movement speed.

13. The non-transitory computer-readable medium of claim 11, the method further comprising indicating the time in the animation sequence when the animation object will arrive at a point in the animation path.

14. The non-transitory computer-readable medium of claim 11, wherein an edit to a location on the animation path results in i) a playhead moving to a corresponding location on an animation timeline and ii) a second object in the 3D animation environment moving to a location in the 3D animation environment that is associated with the second object at the corresponding location of the animation timeline.

15. The non-transitory computer-readable medium of claim 11, wherein one portion of the animation path is defined in the 3D animation environment based on a first frame of reference and another portion of the animation path is defined in the 3D animation environment based on a second frame of reference.

\* \* \* \* \*